United States Patent
Mori et al.

(10) Patent No.: US 11,933,398 B2
(45) Date of Patent: Mar. 19, 2024

(54) TWO-SPEED TRANSMISSION APPARATUS FOR ELECTRIC VEHICLE

(71) Applicant: UNIPRES CORPORATION, Yokohqma (JP)

(72) Inventors: Akimasa Mori, Fuji (JP); Hiroaki Ono, Fuji (JP)

(73) Assignee: UNIPRES CORPORATION, Kanagawa (JP)

(*) Notice: Subject to any disclaimer, the term of this patent is extended or adjusted under 35 U.S.C. 154(b) by 0 days.

(21) Appl. No.: 18/024,989

(22) PCT Filed: Jan. 29, 2022

(86) PCT No.: PCT/JP2022/003465
§ 371 (c)(1),
(2) Date: Mar. 7, 2023

(87) PCT Pub. No.: WO2022/176579
PCT Pub. Date: Aug. 25, 2022

(65) Prior Publication Data
US 2024/0011559 A1    Jan. 11, 2024

(30) Foreign Application Priority Data

Feb. 18, 2021 (JP) .................................. 2021-024313

(51) Int. Cl.
*F16H 63/30* (2006.01)
*B60L 15/20* (2006.01)
(Continued)

(52) U.S. Cl.
CPC ...... *F16H 63/3043* (2013.01); *B60L 15/2009* (2013.01); *F16H 3/54* (2013.01);
(Continued)

(58) Field of Classification Search
CPC ...... F16H 3/54; F16H 63/24; F16H 2063/305; F16H 2063/3063; F16H 2063/3066;
(Continued)

(56) References Cited

U.S. PATENT DOCUMENTS 4,189,962 A * 2/1980 Chung .................... F16H 3/663
475/277
5,508,574 A * 4/1996 Vlock ...................... B60L 50/61
310/83

(Continued)

FOREIGN PATENT DOCUMENTS

JP    2013-108619 A    6/2013
JP     6028507 B2    11/2016
(Continued)

OTHER PUBLICATIONS

International Search Report for PCT/JP2022/003465 dated Apr. 12, 2022.

*Primary Examiner* — Colby M Hansen
(74) *Attorney, Agent, or Firm* — Sughrue Mion, PLLC

(57) ABSTRACT

Two-speed transmission apparatus for electric vehicle comprises a planetary gear mechanism 16, friction brake 28 and friction clutch 26 in coaxial arrangement between input axis 10 and output axis 12, first speed is obtained by fastening the friction brake 28 and one-on-one second speed is obtained by fastening friction clutch 26. The electric actuator 30 to switch first speed and second speed comprises electric motor 32, a torque-thrust converting mechanism 36 and pusher 34. The torque-thrust converting mechanism 36 comprises inside cylindrical screw 40 being rotated by control motor 32 and outside cylindrical nut 42 which is screwed with cylindrical screw 40 and is connected to pusher 34 so as to integrally axis-move. The control motor 32 may include an electromagnetic brake to fasten the friction brake 28 and the (Continued)

friction clutch 26. Thrust of the axial direction may be transmitted by the swing of an arm 316.

20 Claims, 15 Drawing Sheets

(51) Int. Cl.
*F16H 3/54* (2006.01)
*F16H 63/24* (2006.01)

(52) U.S. Cl.
CPC ....... *F16H 63/24* (2013.01); *F16H 2063/305* (2013.01); *F16H 2063/3063* (2013.01); *F16H 2063/3066* (2013.01); *F16H 2200/0021* (2013.01); *F16H 2200/0034* (2013.01); *F16H 2200/2005* (2013.01); *F16H 2200/2035* (2013.01); *F16H 2200/2066* (2013.01); *F16H 2200/2082* (2013.01)

(58) Field of Classification Search
CPC ..... F16H 2200/0021; F16H 2200/0034; F16H 2200/2005; F16H 2200/2035; F16H 2200/2066; F16H 2200/2082
USPC .......................................................... 475/149
See application file for complete search history.

(56) References Cited

U.S. PATENT DOCUMENTS

2010/0099533 A1* 4/2010 Horsfall ................. B60K 17/28
  475/275
2012/0065015 A1* 3/2012 Tamai .................... B60K 6/445
  475/5

FOREIGN PATENT DOCUMENTS

JP        6545921 B1    7/2019
WO     2016/055359 A1  4/2016

* cited by examiner

FIG.9

|  | ONE-WAY CLUTCH 27 | FRICTION BRAKE 28 | FRICTION CLUTCH 26 |
|---|---|---|---|
| FIRST-SPEED DRIVE | ○ | × | × |
| FIRST-SPEED COAST REVERSE | × | ○ | × |
| SECOND-SPEED DRIVE | × | × | ○ |
| SECOND-SPEED DRIVE | × | × | ○ |

○ : FASTENING
× : NON-FASTENING

TO ACTUATOR 30

TWO-SPEED TRANSMISSION APPARATUS FOR ELECTRIC VEHICLE

CROSS REFERENCE TO RELATED APPLICATIONS

This Application is a National Stage of International Application No. PCT/JP2022/003465 filed Jan. 29, 2022, claiming priority based on Japanese Patent Application No. 2021-024313 filed Feb. 18, 2021.

TECHNICAL FIELD

The present invention relates to a two-speed transmission apparatus for an electric vehicle.

BACKGROUND ART

Normally, in electric vehicles (EV) whose motive power is obtained from an electric motor, hybrid vehicles that the motive power is obtained by switching between an engine and the electric power or is obtained from both the engine and the electric power, and vehicle that runs by using only the driving force of the electric motor, transmission to the axle side motive power of the electric motor is provided with only a reduction unit that reduces the rotation of the electric motor to the rotational number which is appropriate for running without installing other transmission apparatus. This structure is adopted because the driving torque can be generated from a low rotational region in the electric motor, the electric motor has the wide usable rotational regions, and the features that the structure is simple and other transmissions in which the structure is complicate are not needed, are important sales points of the EV.

However, even in the EV, advantages that the transmission apparatus is utilized are existed. Even in the electric motor, it is hard to maintain a high efficiency in the all vehicle speed region, and particularly the rotational number of the electric motor becomes higher in the high vehicle speed driving region of the vehicle and then the efficiency is lowered. For improving the above efficiency, there are proposed many kinds of system that a two-speed (stage) transmission apparatus is disposed between the electric motor and the reduction unit. In this type system, at the high vehicle speed driving region that the efficiency is lowered, it is possible to obtain the high vehicle speed by driving the electric motor at the high efficiency when the rotational number of the electric motor is reduced and by using a high gear ratio side of the two-speed transmission apparatus. These two-speed transmission apparatus use a planetary gear mechanism as the transmission mechanism, and set the planetary gear mechanism so as to relatively become the low gear ratio at the first speed and to relatively become the high gear ratio at the second speed. Among them, as an electric actuator to switch a dog clutch (or friction clutch) for the first speed and a friction clutch for the second speed, an actuator comprising an armature made by soft magnetic material, a spring and an electromagnetic coil, is proposed (Patent Document 1). That is, the dog clutch is fastened by the armature under a spring force at the first speed, and the dog clutch (or the friction clutch) is not fastened by driving the armature due to the electromagnetic coil at the second speed and then friction clutch for the second speed is fastened.

As another type electric actuator, an actuator comprises a control motor of electric rotation type and a torque-thrust converting mechanism including an inner diameter-side piston having outer circumference screw strips to mesh with inner circumference screw strips of a worm wheel through the worm wheel from a worm of the control motor, is also proposed (Patent Document 2). The torque-thrust converting mechanism converts the rotation (the torque) of the control motor in to a thrust of an axial direction, and the switching of the friction clutch for the first speed and the friction clutch for the second speed is carried out. In the technique disclosed in Patent Document 2, the rotation of the worm by the control motor is transmitted to the worm wheel, the rotation of the worm wheel is converted into the axial back and forth movement of the piston, selective drive of the first and second friction clutches is carried out and thus the switching of first speed and second speed by the planetary gear mechanism become possible.

THE LIST OF PRIOR DOCUMENTS

Patent Documents

Patent Document 1: Japanese Patent No. 6545921 B2
Patent Document 2: Japanese Patent No. 6028507 B2

SUMMARY OF THE INVENTION

Problems to be Solved by the Invention

Since the technique disclosed in Patent Document 1 uses the dog clutch as the first speed, it is possible to hold the first speed due to the spring force. At this point, the power consumption of the actuator is capable of saving. However, at a time switching from the second speed to the first speed, since the dog clutch does not synchronize as it is, it is necessary to a control such as a torque-up for preventing a transmission shock. Further, since it is impossible to do a regenerative control for the torque-up, a fuel efficiency is disadvantage. Furthermore, although it is necessary to concisely control a fastening capacity at a beginning of the switching of the clutches for the smooth switching, it is impossible to respond for the characteristic of the electromagnetic suction force which is uniquely and suddenly increased due to the distance shortening in the armature control by the electromagnetic coil.

The torque-thrust converting system disclosed in Patent Document 2 does not cause the transmission shock as the dog clutch, and can control a fastening capacity limit of the suitable friction clutch corresponding to the driving state by the torque control of the control motor and resolves the above defects of the dog clutch system. However, the torque-thrust converting system disclosed in Patent Document 2 is a system to convert the rotation of the worm of outer diameter side into the straight motion of the piston of inner diameter side, and a rolling against to a housing of the rotating worm and a supporting mechanism of the thrust are required under the above mechanism. Although the above configuration is not disclosed in Patent Document 2, an adaptation of an angular contact ball bearing to receive the rolling and the thrust is technically common and then the size of the angular contact ball bearing necessarily become enlargement. The adaptation of the angular contact ball bearing increases not only the axial length but also the external diameter of the transmission apparatus and it is not suitable as the parts for EV of which miniaturization is strongly required.

The present invention has been developed in view of the above-described technical problems of the prior art, and an object of the present invention is to provide a construction suitable for miniaturizing a planetary gear-type two-speed transmission apparatus including a torque-thrust converting mechanism which is driven by the electrical rotational-type control motor. The miniaturization and power saving especially are intended.

Means for Solving the Problems

A two-speed transmission apparatus which uses an electric motor for driving wheels according to the present invention is the two-speed transmission apparatus for an electric vehicle which uses the electric motor for driving the wheels, comprising: a housing; an input axis which is supported by the housing and is connected to an electric rotational driving motor side; an output axis which is supported by the housing and is connected to the wheels sides; a first gear mechanism comprising gears to mesh in order to get a transmission ratio of a first speed between the output axis and the input axis when the input axis is connected; a second gear mechanism comprising gears to mesh in order to get a transmission ratio of a second speed, which is higher gear ratio than the first speed of a same rotational direction, between the output axis and the input axis when the input axis is connected; a first multi-plate friction clutch to get the transmission ratio of the first speed by transmitting a rotation of the input axis to the first gear mechanism at a fastening time; a second multi-plate friction clutch which is coaxially and separately in a axial direction arranged on the first multi-plate friction clutch, and to get the transmission ratio of the second speed by transmitting the rotation of the input axis to the second gear mechanism at the fastening time; and an actuator to selectively fasten the first multi-plate friction clutch and the second multi-plate friction clutch, the actuator comprises: a control motor being a torque source; gears to mesh for a torque transmission; an inside diameter member and an outside diameter member to screw to convert a torque into a thrust; a thrust transmission member for transmitting the thrust; and a clutch pressure member to press the first multi-plate friction clutch and/or the second multi-plate friction clutch in order to fasten by the thrust, and the inside diameter member is arranged so as to receive a torque from torque transmission gears, and the outside diameter member is slidably supported by the housing in order to convert the thrust applied to the inside diameter member into the thrust.

It is possible to share a pair of actuators to selectively fasten the first multi-plate friction clutch and the second multi-plate friction clutch. In this case, the clutch pressure member selectively fastens the first multi-plate friction clutch and the second multi-plate friction clutch by moving back and forth in an axial direction with the outside diameter member via the thrust transmission member. It is possible to constitute the outside diameter member and the thrust transmission member as a double cylindrical body comprising an inside cylindrical part and an outside cylindrical part which are a same core with a transmission-apparatus center axis line and a radial direction wall part is integrally connected with the inside cylindrical part and the outside cylindrical part, the inside cylindrical part is screwed with the inside diameter member at outside of the first multi-plate friction clutch and the second multi-plate friction clutch on a central axis line, the outside cylindrical part is slidably fitted into an inner circumferential surface of the housing while facing to the first multi-plate friction clutch or the second multi-plate friction clutch which is located at proximal side, and the clutch pressure member is integrally fixed at the outside cylindrical part so as to locate between the first multi-plate friction clutch and the second multi-plate friction clutch.

As the another embodiment to share a pair of actuators to selectively fasten the first multi-plate friction clutch and the second multi-plate friction clutch, the thrust transmission member rotates (swings) forward and backward by an axial back and forth movement of the inner diameter member, and the clutch pressure member selectively fastens the first multi-plate friction clutch and the second multi-plate friction clutch by the forward and backward rotation of the thrust transmission member. The thrust transmission member is pivotally mounted on the housing at one end, the thrust transmission member is constituted as a swing arm which is loosely fitted into an inner screw member at a diameter conflict position at another end across the first multi-plate friction clutch and the second multi-plate friction clutch, the clutch pressure member pivotally mounted on the swing arm at the diameter conflict position and is located between counter-face surfaces of the first multi-plate friction clutch and the second multi-plate friction clutch, and the forward and backward rotation of the swing arm due to the axial back and forth movement of the inner screw member fastens the first multi-plate friction clutch and the second multi-plate friction clutch while the clutch pressure member meets the first multi-plate friction clutch or the second multi-plate friction clutch.

It is possible to constitute a planetary gear-type transmission mechanism with a first gear mechanism and a second gear mechanism. In the planetary gear-type transmission mechanism, the input axis is coaxially disposed in the housing with the output axis, the planetary gear-type transmission mechanism includes a carrier that a pinion is axially supported and three rotational elements associated with two gears having different tooth number meshing with the pinion, and the input axis and the output axis are connected to two elements of the three rotational elements of a planetary gear mechanism, an arrangement of the first multi-plate friction clutch and the second multi-plate friction clutch against the three rotational elements and the housing constitutes the planetary gear-type transmission mechanism as a first gear mechanism so as to get a first speed transmission ratio between the input axis and the output axis by a fastening of the first multi-plate friction clutch and a no-fastening (release) of the second multi-plate friction clutch due to the thrust transmission mechanism, and an arrangement of the first multi-plate friction clutch and the second multi-plate friction clutch against the three rotational elements and the housing constitutes the planetary gear-type transmission mechanism as a second gear mechanism so as to get a second speed transmission ratio between the input axis and the output axis by a no-fastening (release) of the first multi-plate friction clutch and a fastening of the second multi-plate friction clutch due to the thrust transmission mechanism. Further, without the planetary gear-type transmission mechanism, it is possible to constitute the first gear mechanism and the first gear mechanism by the first spur gears meshing to obtain the first speed transmission and the second spur gears meshing to obtain the second speed transmission.

Further, by providing two actuators (first and second), the first actuator is able to contribute to fasten and release the first multi-plate friction clutch for setting the first speed transmission ratio, and the second actuator is able to contribute to fasten and release the second multi-plate friction clutch for setting the second speed transmission ratio.

The two-speed transmission apparatus according to the present invention is further able to add an electromagnetic brake to selectively control the rotational axis of the control motor. The fastening time of the first multi-plate friction clutch and the second multi-plate friction clutch, the electromagnetic brake can keep the fastening state of the first multi-plate friction clutch and the second multi-plate friction clutch under the low rotational torque of the control motor by braking and restraining the rotational axis of the control motor. Then, the first multi-plate friction clutch and the second multi-plate friction clutch are able to again grasp by performing the braking of the rotational axis of the control motor at a predetermined cycle.

Furthermore, in a case that the transmission of the transmission ratio of the first speed and the second gear mechanism is performed by selectively fastening the first multi-plate friction clutch and the second multi-plate friction clutch, it is possible to mount the one-way clutch in parallel to the multi-plate friction clutch contributing to the transmission ratio of the first speed.

Effects of the Invention

In the two-speed transmission apparatus according to the present invention, a meshing screw-type torque-thrust converting mechanism in an actuator of an electric motor control for switching a transmission ratio of a planetary gear mechanism rotates an inside diameter member (a screw), and a switching of a first multi-plate friction clutch and a second multi-plate friction clutch is carried out by axially moving an outside diameter member (a nut). Since the internal diameter member being rotated becomes small, it is possible to realize the miniaturization of the torque-thrust converting mechanism, to reduce the thrust causing un the inside diameter member and further to adopt a simple bearing mechanism. Further, it is possible to suitably control the switching of the friction clutch and friction brake corresponding to the driving state, and the advantage of the electric motor being the power saving is not impaired.

The inside diameter member and the outside diameter member in the torque-thrust converting mechanism are duplex cylindrical shapes, and a screw portion between an inside shape portion of the outside diameter member and the inside diameter member is arranged outside of the first multi-plate friction clutch and the second multi-plate friction clutch. Thereby, it is possible to suppress an axial length on the axis mounting portion of the torque-thrust converting mechanism and to realize the miniaturization.

Further, by using the control motor including the electromagnetic brake, it is possible to fasten and keep the first multi-plate friction clutch and the second multi-plate friction clutch and to minimize a service torque of the control motor. In addition, it is possible to save the power, to suppress the heating of the motor and further to simplify the cooling system.

Furthermore, by the switching operation based on use of the one-way clutch in parallel, it is possible to manage by only the fastening of the multi-plate clutch at the coast driving and to perform the transmission operation without the shock not to be necessary the torque-up. In addition, it is possible to turn to the power regeneration and to aim to the power saving and the efficiency up.

By providing two pairs of the actuator and fastening respective the first multi-plate clutch and the second multi-plate clutch, it is possible to resolve the empty running period that the pusher moves between the first multi-plate clutch and the second multi-plate clutch in a case of switch type and to laborsaving the control motor and to omit the one-way clutch.

BRIEF DESCRIPTION OF THE DRAWINGS

In the accompanying drawings:

FIG. 6A shows an origin position, FIG. 6B does a friction brake fastening position and FIG. 6C does a friction clutch fastening position;

FIG. 9 is an explanation diagram to show the fastening and non-fastening (release) of the one-way clutch, the friction brake and the friction clutch at respective stages in the embodiment of the present invention;

FIG. 13A shows an operation of the friction brake and FIG. 13B does an operation of a solenoid;

MODE FOR CARRYING OUT THE INVENTION

Figure 1:
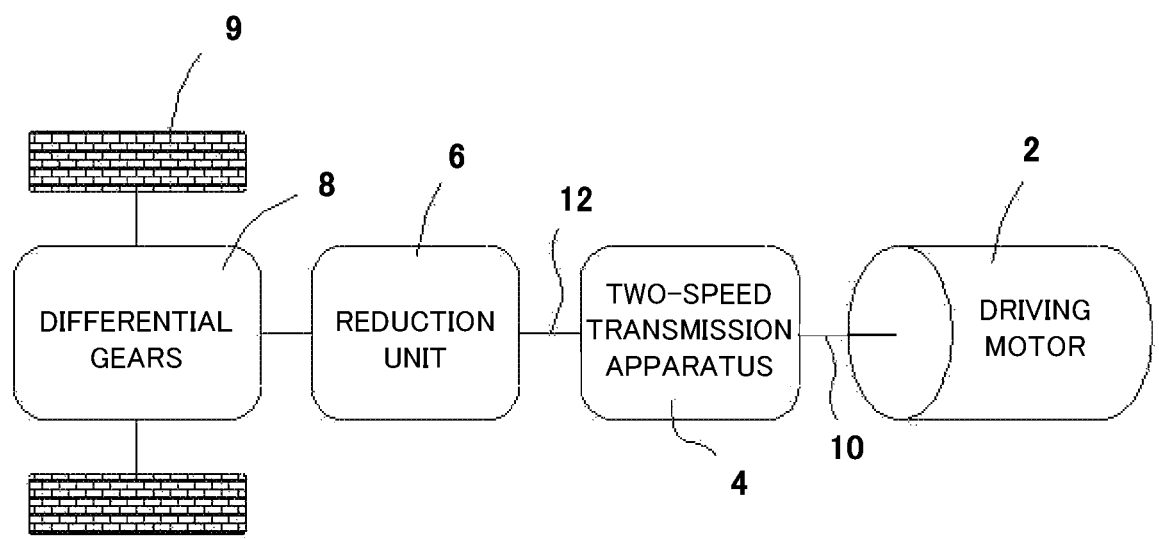
FIG. 1 is a schematic diagram of a wheel driving train of an electric vehicle according to the present invention.

FIG. 1 is a schematic diagram of a wheel driving train of an electric vehicle according to the present invention. The reference numeral 2 denotes a driving motor being an electric motor for running, the reference numeral 4 does a two-speed transmission apparatus of the present invention, the reference numeral 6 does a reduction unit, the reference numeral 8 does differential gears and the reference numeral 9 does wheels of the vehicle. The two-speed transmission apparatus 4 includes an input axis 10 connected to the driving motor 2 and an output axis 12 connected to the reduction unit 6. The reduction unit 6 is configured by the meshing gears which are received in a casing, and is disposed for reducing the high speed rotation of the driving motor 2 to the rotational number which is appropriate for a running by the wheels 9. In a case of the normal electric vehicle that the two-speed transmission apparatus 4 is not disposed, the setting value of the reduction ratio in the reduction unit 6 is a value near "3.5". This value is suitable for the normal low vehicle speed driving in which the driving motor 2 is operated in the high efficient rotational number region. In this setting, since the rotational number of the electric motor in the high vehicle speed driving increases too much and the efficiency does not become the suitable value, the two-speed transmission apparatus 4 is disposed. In the present invention, the transmission apparatus 4 includes a planetary gear mechanism, and the first-speed is reduced by a sun gear being an input and a carrier being an output (for example, the reduction ratio is "1.6") and the second-speed is a direct coupling of the input axis and the output axis (the reduction ratio is "1.0") in the embodiment of the present invention. If the reduction ratio of the reduction unit 6 is set to "2.2", the total reduction ratio is "3.52" (=1.6×2.2) and becomes a substantially total reduction ratio in a case of the conventional transmission which has not the two-speed transmission apparatus. Further, in a case that the vehicle is driven by the second-speed gear, the total reduction ratio is "2.2" (=1.0×2.2) and becomes small. Since the total reduction ratio becomes small as described above, in comparison with a low vehicle speed driving region of the driving motor 2, it is possible to drive the driving motor 2 in the rotational region that the efficiency of the low rotational region is high in the high speed driving region and to realize the high speed driving.

Figure 2:
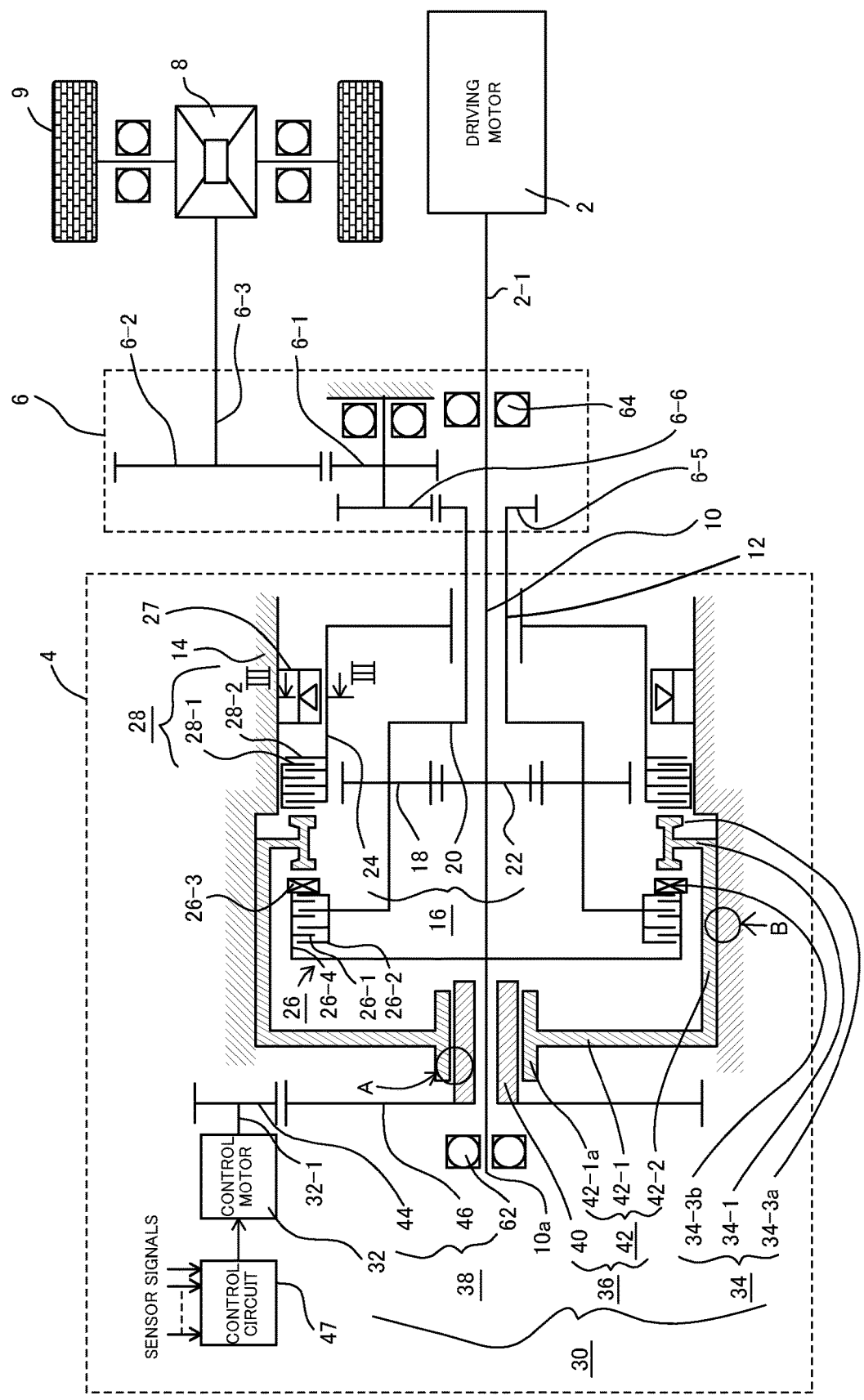
FIG. 2 is a skeleton diagram to schematically illustrate a whole two-speed transmission apparatus in an embodiment according to the present invention.

FIG. 2 is a skeleton view to show the basic configuration of the two-speed transmission apparatus 4 and the reduction unit 6 of the driving train in FIG. 1. In the two-speed transmission apparatus 4, the output axis 12 is cylindrical and coaxial to a center of the input axis 10 (which is connected to an output axis 2-1 of the driving motor 2). That is, the output axis 12 is provided common to the rotational center.

The two-speed transmission apparatus 4 includes the planetary gear mechanism 16 disposed in the housing 14, and planetary gear mechanism 16 comprises three rotational components which are a carrier 20 to rotatably support plural pinions 18 disposed toward a circumferential direction with an interval, a sun gear 22 whose rotational center is common to the carrier 20 and which meshes with the pinions 18, and a ring gear 24 whose rotational center is common to the carrier 20 and which meshes with the pinions 18. The sun gear 22 is connected to the input axis 10, and the carrier 20 is connected to output axis 12 side. Further, a multi-plate friction clutch (hereinafter, merely referred to as "the friction clutch") 26 as the fastening element, a one-way clutch 27 and a multi-plate friction brake (hereinafter, merely referred to as "the friction brake") 28 are provided. At the first speed (coast), the ring gear 24 is fastened to a housing 14 by the one-way clutch 27 so that the reduction ratio of the carrier 20 of the output axis 12 side is "1.6" against the sun gear 28 of the input axis 10 side. At the second speed, the input axis 10 and the output axis 12 are rotated with one body by connecting the sun gear 28 and the carrier 20 with the friction clutch 26 so that the reduction ratio is "1.0" and the speed is higher than the first speed. At the driving in the first speed, the motion power transmission is carried out by that the one-way clutch 27 restrains the ring gear 24 for the housing 14. Then, at the coast (the reduction) driving when a driver releases an access pedal, the restraint to the housing 14 by the one-way clutch 27 is released. In this case, it is possible to continue the first speed coast driving without shock since the restraint to the housing 14 of the ring gear 24 is secured due to the fastening of the friction brake 28. The operation of the one-way clutch 27 will be explained later.

Further, the one-way clutch 27 has a function to secure the torque transmission at an idle (free) running time at a switching operation of the friction clutch 26 and the friction brake 28. That is, in the present embodiment, the friction clutch 26 and the friction brake 28 are separately arranged in the axial direction, and the switching fastening of the friction clutch 26 and the friction brake 28 is performed by that a pusher described later moves back and forth toward the axial direction. In this connection, a non-fastening state is necessarily occurred, nonetheless instantaneously, on the way of the switching operation. However, at the idle running, especially at the switching from the first speed to the second speed, the one-way clutch 27 secures the torque of the output axis 12 and can utilize to protect the shifting shock.

The planetary gear mechanism 16 may use a double pinion type having different diameter pinions. In this case, the carrier supported the pinions and the gears (the sun gear or the ring gear) of the teeth number to mesh with the different diameter portions of the pinion become the three rotational elements.

The multi-plate friction clutch 26 and the multi-plate friction brake 28 are coaxially arranged on the central axis of the two-speed transmission apparatus 4 with the interval. As everybody knows, the friction clutch 26 includes the input axis 10, or a drive disc 26-1 being rotated with the sun gear 22 and a driven disc 26-2 being rotated with the carrier 20, and further includes a thrust bearing 26-3 on the proximity side of the friction brake 28 in the friction brake 28. The drive disc 26-1 is slidable, in the axial direction, against a clutch drum 26-4 being rotated with the sun gear 22, and the driven disc 26-2 is slidable, in the axial direction, against a clutch drum (an inner drum 66 shown in FIG. 15) being fixed to the carrier 20 by the spline fitting. Also as everybody knows, the friction brake 28 includes the drive disc 28-1 which is movable toward the axial direction by the spline fitting with the inner circumference of the housing 14 and is connected with a non-rotation state, and the driven disc 28-2 which is movable toward the axial direction by the spline fitting with the ring gear 24. The drive disc 28-1 is slidable, toward the axial direction, to the housing 14 by the spline fitting.

The configuration of the real machine with the planetary gear mechanism 16, the friction clutch 26 and the friction brake 28 will be described with reference to FIG. 15 hereinafter.

Figure 3:
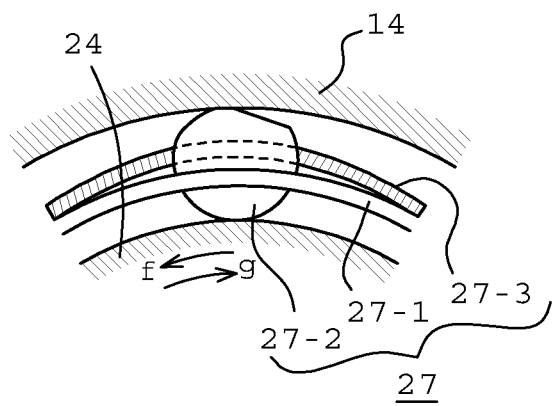
FIG. 3 is a schematic view to briefly show an example of an one-way clutch to be used in the two-speed transmission apparatus shown in FIG. 2, and is a view taken along a III-III line of FIG. 2.

Although the type of the one-way clutch 27 is not limited, a type to hold a cam 27-2 held in a hold ring 27-1 by a garter spring 27-3 as shown in FIG. 3 may be used in the present embodiment. The one-way clutch is not limited to this type and may be, for example, a roller type. In the first speed of the two-speed clutch 4, at the drive running, the one-way clutch 27 restrains the ring gear 24 to the housing 14 against the rotation (a counter-clock wise (CCW) direction "f" in FIG. 3) of the ring gear 24. At the coast running, the rotation (a clock wise (CW) direction "g" in FIG. 3) is free to the housing 14.

In the two-speed transmission apparatus 4 according to the present invention, the first speed drive (non-coast driving time) does not fasten the friction clutch 26 and restrains the ring gear 24 to the housing 14 by the one-way clutch 27, and the friction brake 28 generates a no-clearance state (however, the fastening torque=0) by the drive disc 28-1 and the driven disc 28-2 so that the one-way clutch 27 simultaneously generates the fastening torque at a transient time into the first speed coast drive which is idle time. Contrary, the second speed drive (both of the coast drive and the non-coast drive) is performed by fastening the friction clutch 26 (the one-way clutch 27 idles the ring gear 24 to the housing 14). That is, the friction brake 28 makes the no-clearance (the fastening torque of the friction brake 28 is occurred only the coast drive time) on the drive disc 28-1 and the driven disc 28-2 at the first speed and the friction clutch 27 makes the no-clearance on the drive disc 26-1 and the driven disc 26-2 at the second speed, and the fastening torque is generated regardless of the non-cast drive and the coast drive. An actuator 30 is provided to switch the friction clutch 26 and the friction brake 28.

Figure 4:
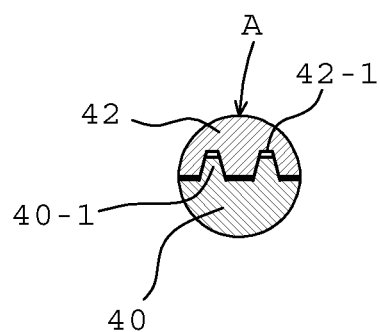
FIG. 4 is a schematic enlarged view to show a part indicated by a circle "A" in FIG. 2, and schematically illustrates a screwed state of a cylindrical screw and a cylindrical nut in a torque-axial direction thrust converting mechanism.
Figure 5:
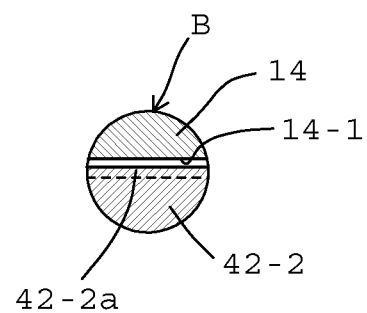
FIG. 5 is a schematic enlarged view to show a part indicated by a circle "B" in FIG. 2, and schematically illustrates a spline connection between a pusher and housing.
Figure 6A:
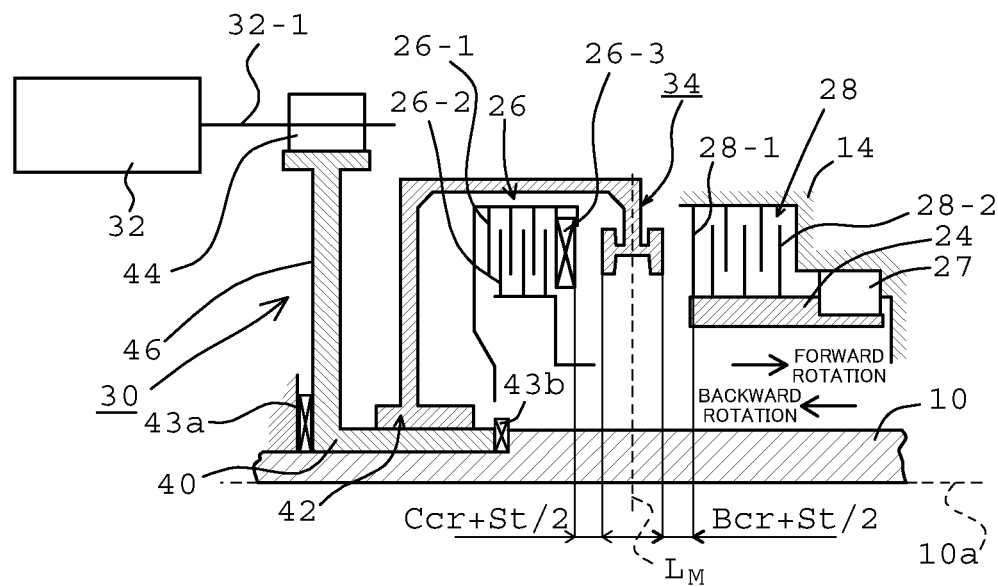
FIGS. 6A to 6C are operation explaining views of an actuator.
Figure 6B:
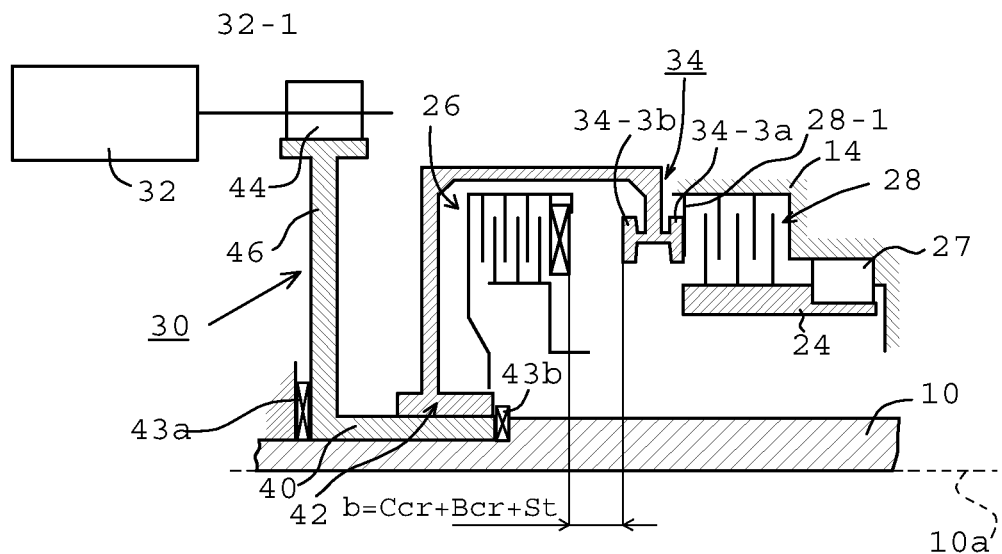
Figure 6C:
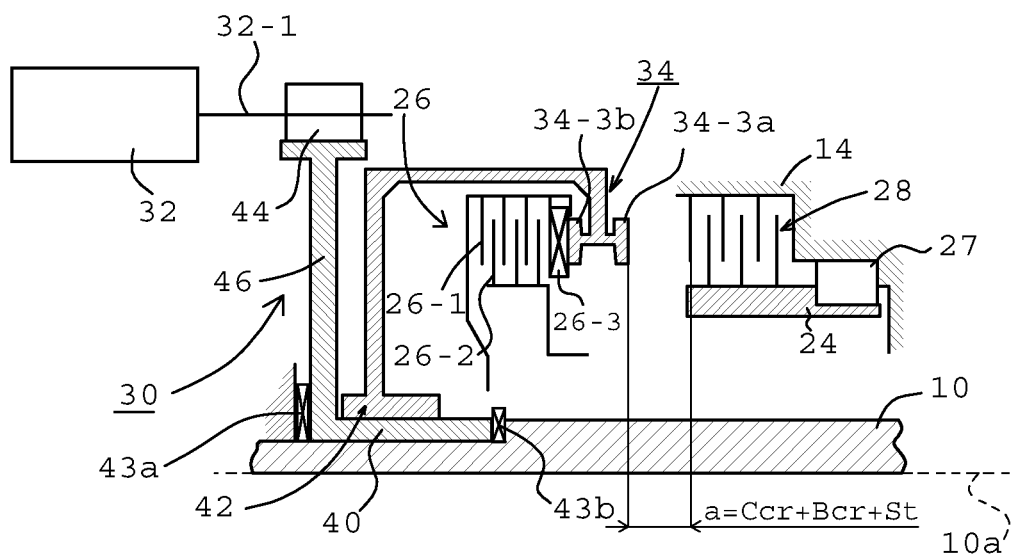

The actuator 30 comprises a control motor 32 being an electrical motor, a pusher (a pressure member of the present invention) 34 to selectively fasten the friction brake 28 (in the present invention, the first multi-plate friction clutch causing the first speed) and the friction clutch 26 (in the present invention, the second multi-plate friction clutch causing the second speed), a torque-thrust converting mechanism 36 to convert the rotation of the control motor 32 into the thrust (a back and forth motion in the axial direction of the pusher 34) and a motion power transmission mechanism 38 to transmit the rotation of the control motor 32 to the torque-thrust converting mechanism 36. The torque-thrust converting mechanism 36 comprises a cylindrical screw 40 (the inside diameter member of the present invention) to screw together and a cylindrical nut 42 (corresponding to the outside diameter member). In the present embodiment, the cylindrical nut 42 is formed as a double tube with a central screw portion 42-1a, a disc-shaped plate portion 42-1 extended to the radial direction and a cylindrical portion 42-2 extended to the axial direction from the disc-shaped plate portion (a wall portion of the radial direction) 42-1, and the cylindrical portion 42-2 is capable of moving (the rotational direction is restrained) only to axial direction in the inner circumference of the housing 14. Consequently, the axial direction moving of the cylindrical nut 42 is capable by the rotation of the cylindrical screw 40. For the purpose that the cylindrical nut 42 is movable only to the axial direction, the cylindrical portion 42-2 of the cylindrical nut 42 includes a spline 42-2a on the outer circumference as shown in FIG. 5, and the spline 42-2a meshes with a spline 14-1 of the inner circumference of the housing 14. Thereby, the cylindrical nut 42 can move back and forth to the axial direction against the housing 14, but is restrained to the rotational direction by the housing 14. In this connection, it is possible to have the back and forth movement of the axial direction of the cylindrical nut 42 due to the rotation of the cylindrical screw 40. Further, FIG. 4 schematically shows the meshing state between the cylindrical screw 40 and the cylindrical nut 42, external screw strips 40-1 of the cylindrical screw 40 are screwed with the inner screw strip 40-2 of the cylindrical nut 42, and the cylindrical nut 42 is restrained the rotation and is movable to only the axial direction. Accordingly, the rotation of the cylindrical screw 40 by the control motor 32 is converted (torque-thrust conversion) into the axial direction movement of the cylindrical nut 42 corresponding to lead angle. Although the torque-thrust conversion generates a thrust force in the cylindrical screw 40, the thrust bearings 43a and 43b are provided, as shown in FIGS. 6A to 6C, between housing opposite faces at both sides of the cylindrical screw 40 against the thrust force. The pusher 34 is formed with a ring shape as a whole and includes a ring-shaped disc portion 34-1 integrally connected to the cylindrical portion 42-2 at the outer circumference end portion and a friction brake driving portion 34-3a and a friction clutch driving portion 34-3b respectively provided at the friction clutch 26 and the friction brake 28 at the inner circumference end portion of the ring-shaped disc portion 34-1 so as to be opposite for the axial direction. The friction clutch driving portion 34-3b is oppositely arranged to the thrust bearing 26-3 positioned at the most closed to the friction brake 28 at the drive disc side of the friction clutch 26. The thrust bearing 26-3 is arranged so as not to injure the rotation of the friction clutch 26 (the carrier 20) against the thrust force applying from the friction clutch driving portion 34-3b of the pusher 34. Further, the friction brake driving portion 34-3a is oppositely arranged at the most closed to the friction clutch 26 of the drive disc 28-1 of the friction brake 28. In the present embodiment, the configuration that the pusher 34 is mounted on the cylindrical portion 42-2 is a mechanism sharing the torque-thrust conversion and the thrust transmission so that the axial direction sliding in the torque-thrust conversion is supplemented on the cylindrical portion 42-2.

In the above described structure of the actuator 30, the reciprocal rotational motion of the cylindrical screw 40 is converted into the left-right linear motion of the axial direction of the cylindrical nut 42 which is screwed with the cylindrical screw 40 and is blocked the rotation, and the linear motion is transmitted to the pusher 34 via the cylindrical portion 42-2 of the cylindrical nut 42. Then, the friction clutch 26 and the friction brake 28 are switched by the friction brake driving portion 34-3a and the friction clutch driving portion 34-3b, and the switching operation will be described later.

In FIG. 2, a rotational power transmission mechanism 38 in the two-speed transmission apparatus 4 comprises a driving spur gear 44 fixed to the output axis 32-1 of the control motor 32 and a driven spur gear 46 which is meshed with the driving spur gear 44 and is coaxially fixed at the cylindrical screw 40 to the central axis of the transmission apparatus 4. The forward and backward rotation of the control motor 32 is transmitted to the cylindrical screw 40 via the rotational power transmission mechanism 38. Although the control motor 32 does not include an electromagnetic brake in the present embodiment, the control motor with electromagnetic brake may be used as described later. Since the rotational power transmission mechanism 38 in this embodiment comprises spur gears 44 and 46, the thrust force superimposed on the cylindrical screw 40 of the torque-thrust converting mechanism 36 by the driven spur gear 46 is preponderantly smaller than the worm mechanism disclosed in Patent Document 2. Accordingly, there is a merit that excessive load is not applied to the thrust bearings 43a and 43b.

The reduction unit 6 includes an input axis 6-1, an output axis 6-2, a gear set for relay and a gear set for transmission. The gear set for relay comprises a gear 6-3 on the output axis 12 of the two-speed transmission apparatus 4 and a gear 6-4 on the input axis 6-1 meshing with the gear 6-4, and the gear set for transmission comprises a gear 6-5 on the input axis 6-1 and a gear 6-6 on the output axis 6-2 meshing with the gear 6-5. It is possible to obtain the above described reduction ratio "2.2" between the output axis 12 of the two-speed transmission apparatus 4 and the output axis 6-2 of the reduction unit 6 by the reduction unit 6. The output axis 6-2 of the reduction unit 6 is connected to the differential gears 8.

"The Switching of the Clutch and the Brake by the Actuator"

Figure 7:
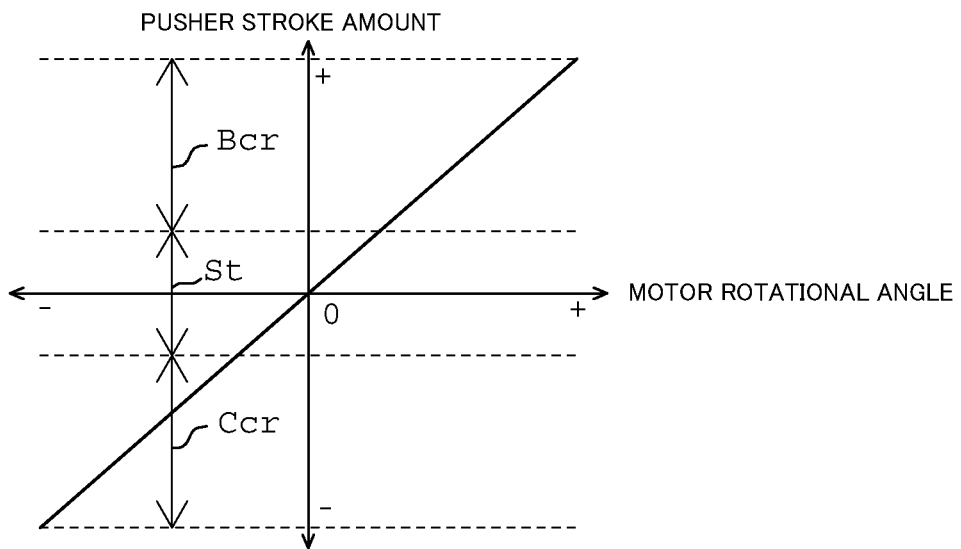
FIG. 7 is a diagram to show a relation between a rotational angle of a control motor and stroke amount of the pusher.

Next, the switching operation of the friction clutch 26 and the friction brake 28 by the actuator 30 will be described with reference to FIGS. 6A to 6C and FIG. 7. Although the actuator 30 is a little different from FIG. 2 in a view, it is a mere convenient drawing and is basically the same. In FIG. 6A, a reference numeral "$L_M$" indicates an intermediate point (corresponding to a coordinates origin of FIG. 7) of the pusher 34 between the friction clutch 26 and the friction brake 28, and the pusher 34 is located at the intermediate point between the friction clutch 26 and the friction brake 28. In FIG. 7, the coordinate horizontal axis indicates a rotational angle of the rotational axis 32-1 of the control motor 32, and the coordinate vertical axis indicates a stroke amount of the pusher 34. The pusher 34 moves to the right in FIGS. 6A to 6C by the forward rotation of the control motor 32 and a value of the stroke amount increases to the positive side in FIG. 7, and the pusher 34 moves to the left in FIGS. 6A to 6C by the backward rotation of the control motor 32 and a value of the stroke amount increases to the negative side in FIG. 7. At the intermediate point $L_M$ (corresponding to the coordinates origin) in FIG. 6A, the pusher 34 allows a clearance "Ccr+St/2" between the opposite end (the thrust bearing 26-3 of the most closing side) of the friction clutch 26 and does a clearance "Bcr+St/2" between the opposite end of the friction brake 28. Here, the item "Ccr" is the clearance value from the intermediate point $L_M$ being necessary so as not to occur the drag torque (so as not to occur the drag between the drive disc 26-1 and the driven disc 26-2) in the friction clutch 26 when the friction clutch 26 is idling, and the item "Bcr" is the clearance value from the intermediate point $L_M$ being necessary so as not to occur the drag torque (so as not to occur the drag between the drive disc 28-1 and the driven disc 28-2) in the friction brake 28 when the friction brake 28 is idling. Further, the item "St" is an allowance margin so as not to occur the drag torque on the both of the friction clutch 26 and the friction brake 28.

The clearance against the friction brake 28 becomes Bcr when the pusher 34 moves to the right direction by "St/2" from the intermediate point $L_M$ in FIG. 6A by the forward rotation of the output axis 32-1 of the control motor 32. When the pusher 34 further moves to the right direction by "Bcr", the friction brake driving portion 34-3a of the pusher 34 comes into contact with the proximal-side drive plate 28-1 of the friction brake 28 as shown in FIG. 6B. Thereby, the drive disc 28-1 and the driven disc 28-2 of the friction brake 28 are, but are no torque, leading to a perfect contact (no clearance). Then, by increasing the forward torque of the control motor 32, the fastening (the switching into the first speed) of the friction brake 28 is completed. This state is a state that the pusher 34 moves to the right direction by "Bcr+St/2", and generates the space "Ccr+Bcr+St" between the friction clutch driving portion 34-3b of the pusher 34 and the friction clutch 26 at an opposite side. The space "Ccr+Bcr+St" corresponds to a target stroke amount "b" of the pusher 34 in order to switch from the friction brake 28 to the friction clutch 26.

In order to perform the transmission from the first speed to the second speed, it is necessary to switch the friction brake 28 from the fastening state of FIG. 6B to the non-fastening (releasing) state and to fasten the friction clutch 26. In this time, the pusher 34 moves to the left direction by "Bcr+Ccr+St" by the backward rotation of the output axis 32-1 of the control motor 32, and the friction clutch driving portion 34-3b of the pusher 34 comes into contact with the proximal-side thrust bearing 26-3. Further, by increasing the backward torque of the control motor 32, the fastening of the friction clutch 26 is completed. This state is shown in FIG. 6C, and also the clearance between the friction brake driving portion 34-3a of the pusher 34 and the friction brake 28 becomes "Ccr+Bcr+St". The clearance "Ccr+Bcr+St" corresponds to a target stroke amount "a" of the pusher 34 in order to switch from the friction clutch 26 to the friction brake 28.

"The Fastening Force Deepening Due to Elastic Deformation at the Fastening Time"

Figure 8:
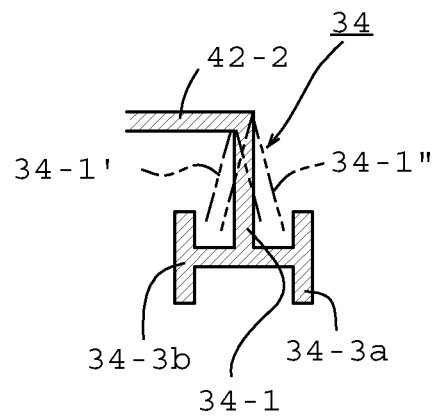
FIG. 8 is an explanation view of an embodiment to elastically transform a switching driving portion of the pusher at a switching time of the friction clutch and the friction brake.

In the switching operation between the friction clutch 26 and the friction brake 28 by the pusher 34 shown in FIGS. 6A to 6C, it is possible to move the pusher 34 so as to further deep the engagements when the friction brake driving portion 34-3a and the friction clutch driving portion 34-3b respectively engage with an opposite portion of the friction clutch 26 and an opposite portion of the friction brake 28. In this case, as exaggeratedly shown in FIG. 8, the ring-shaped disc portion 34-1 is deformed as an imaginary line 34-1' when the friction brake driving portion 34-3a contacts with the friction brake 28 and as an imaginary line 34-1" when the friction clutch driving portion 34-3b contacts with the friction clutch 26 for the root position of the cylindrical portion 42-2. These deformations are within the elasticity limit and the sure fastening state of the friction clutch 26 and the friction brake 28 is obtained by the elastic force. In this case, the target stroke amounts "a" and "b" of the friction clutch 26 and the friction brake 28 of FIGS. 6B and 6C are respectively obtained by the below equations.

$$a = Bcr + Ccr + St + Dcr$$

$$b = Bcr + Ccr + St + Dbr$$

where, "Dcr" is an elastic deformation amount on the driving center in a case of FIG. 6B, and "Dbr" is an elastic deformation amount on the driving center in a case of FIG. 6C.

"The Transmission Operation of the Two-Speed Transmission Apparatus"

Next, the transmission operation of the transmission apparatus 4 of the present embodiment will be described. The transmission operation is shown in FIG. 9, and the mark "o" indicates the fastening operation and the mark "x" does the release (non-fastening) operation. The two-speed transmission apparatus 4 realizes the two-step gear ratio of the first speed and the second speed and vice versa. Further, the vehicle state is basically classified into a driving state (the drive) which accelerates the vehicle by outputting the forward torque of the driving motor and a deaccelerating state (the coast) which deaccelerates the vehicle by regenerating the power and outputting the backward torque of the driving motor. Hereinafter, the combination of the gear stage and the drive and the coast state will be described.

The First Speed Driving Time:

At the first speed driving time, the pusher 34 is positioned at the right portion in FIG. 6B and has no clearance against the friction brake 28, and is not fastened against the friction clutch 26 and the clearance is the maximum. Although the pusher 34 is no clearance against the friction brake 28, the control motor 32 is controlled in accordance with the flow chart shown in FIG. 10 described below and the friction brake 28 is not fastened.

Figure 13A:
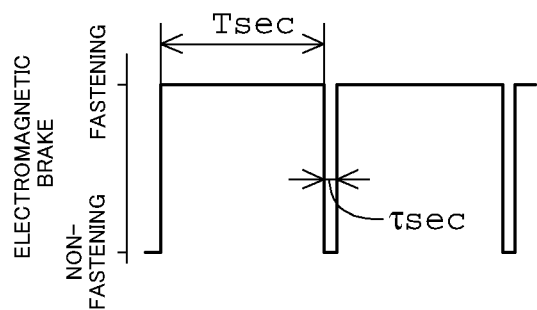
FIGS. 13A and 13B are schematic timing charts to explain re-grasping operations of the friction clutch and the friction brake by the electromagnetic brake.
Figure 13B:
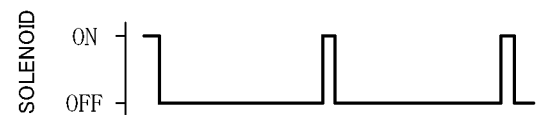

In a case of the operation FIGS. 13A and 13B adopted a motor with the electromagnetic clutch as the control motor 32, since the friction clutch 26 keeps the fastening state by the electromagnetic clutch at the first speed driving time, the friction brake 28 becomes the fastening state at the fastening time of the electromagnetic clutch. However, since the electromagnetic clutch re-grasps, the friction brake becomes the non-fastening state "x" during the re-grasp operation and the one-way clutch 27 of the fastening state becomes the fastening sate "o" to secure the motion power transmission.

The input rotation/torque at the first speed driving time (the driving motor torque is forward) inputs into the input axis 10 from the driving motor 2 and rotates the sun gear 22 in FIG. 2. The rotation of the ring gear 24 is limited by the one-way clutch 27 and is stopped (the fastening state of the one-way clutch 27 is shown by "o" in FIG. 9). Namely, the one-way clutch 27 has a function so that the cam 27-2 inhibits the counter-clock wise (CCW) rotation of the ring gear 24 in FIG. 3. As a result, the sun gear 22 is able to rotate the carrier 20 and to transmit the torque and the rotation to the output axis 12. The output axis 12 transmits the torque and the rotation to the wheels 9 as the driving force via the reduction unit 6 and the differential gears 8 and accelerates the vehicle. As is well known, the gear ratio of the first speed is "$Zs/(Zs+Zr)$" (the deceleration). However, "$Zs$" denotes teeth number of the sun gear 22 and "$Zr$" denotes teeth number of the ring gear 24.

The First Speed Deceleration (the Coast) Time:

At the first speed deceleration (coast) time, the pusher 34 is located at the right position in FIG. 6B (the pusher 34 is the contact state with the friction brake 28) and is not the no-torque state as the first speed driving time, the torque control of the control motor 32 is performed as described later so as to generate an appropriate fastening torque. For this reason, the friction brake 28 is fastened (the mark "o" in FIG. 9).

The input rotation/torque at the first speed deceleration time is inputted into the carrier 20 from the output axis 12 on the contrary in the driving time, and the torque is applied on the pinion 18 in a direction to rotate the sun gear 22 and the ring gear 24. Since the ring gear 24 is the torque input toward the idling direction (a state that the cam does not work since the rotation is a clock wise (CW) in FIG. 3) of the one-way clutch 27, the idling of the ring gear 24 is prevented by fastening the friction brake 28. Thereby, it is possible to directly transmit the rotation from the wheels 9 to the driving motor 2, and the backward directional torque is transmitted to the wheels 9 by that the driving motor 2 generates the backward torque due to the power regeneration and the vehicle is decelerated.

The Second Speed Driving Time:

At the second speed driving time, since the pusher 34 is located in the left side in FIG. 6C and is applied an appropriate torque from the control motor 32, the friction clutch 26 is fastened (the mark "o" in FIG. 9) and the friction brake 28 is not fastened. The input rotation/torque at the second speed driving time is inputted into the input axis 10 from the driving motor 2 and rotates a clutch drum being connected and fitted with a sun gear shaft. The clutch drum rotates with the same rotation of the driving motor 2 till the carrier 20 via the friction clutch 26 being fastened. Since the carrier shaft is also integrally connected to the carrier 20, the output axis 12 is rotated with the same of the driving motor 2 from the carrier 20 (the gear ratio is "1.0" and is relatively the increasing speed in comparison with the first speed). In this time, the torque of the idling direction of the one-way clutch 27 is applied on the ring gear 24, and the driving motor 2 is rotated with the same speed since the friction brake 28 is not fastened.

The Second Speed Deceleration (the Coast) Time:

The friction clutch 26 is fastened (refer to FIG. 9), and the friction brake 28 is not fastened and is same with the second speed driving time.

The input rotation/torque at the second speed deceleration time is a reverse flow at the driving time. The input rotation/torque is inputted into the carrier 20 and the carrier shaft from the output axis 12 and rotates with the same speed from the sun gear shaft to the driving motor 2 via the friction clutch 26 being fastened. Thereby, the backward torque is transmitted to the wheels 9 by the power regeneration of the driving motor 2 at the second speed no-driving time and the vehicle is appropriately decelerated.

The Reverse Time:

The driving motor 2 reversely rotates at the reverse time, the reverse rotation/torque is inputted into the sun gear 22, and the torque is applied on the sun gear 22 in a direction to reversely rotate the ring gear 24 via the carrier 20. Since the ring gear 24 is the torque input toward the idling direction of the one-way clutch 27, the idling of the ring gear 24 is prevented by fastening (FIG. 9) the friction brake 28. Thereby, the reverse torque and the rotation of the driving motor 2 are transmitted to the wheels 9.

"The Control of the Actuator (a Case without the Electromagnetic Brake)"

Next, regarding the switching operation of the first speed and the second speed, the control logic of the control motor 32 in the actuator 30 will be described with reference to a flow chart of FIG. 10. In the flow chart, the operation at the reverse time is omitted. A control circuit including a microcomputer for the transmission control of the control motor 32 is indicated by the reference numeral "47" in FIG. 2. Into the control circuit 47, an accelerator opening degree, a vehicle speed and signals of a position sensor of the rotational axis 32-1 of the control motor 32 and another sensors are inputted, the control is carried out by a software stored inside. Besides, although the position of the pusher 34 to the friction brake 28 and the friction clutch 26, or the calculation on necessary stroke amount is not concretely described below, it is possible to grasp by well-known methods due to the detected value of the position of the rotational axis 32-1 mounted on the control motor 32.

Figure 10:
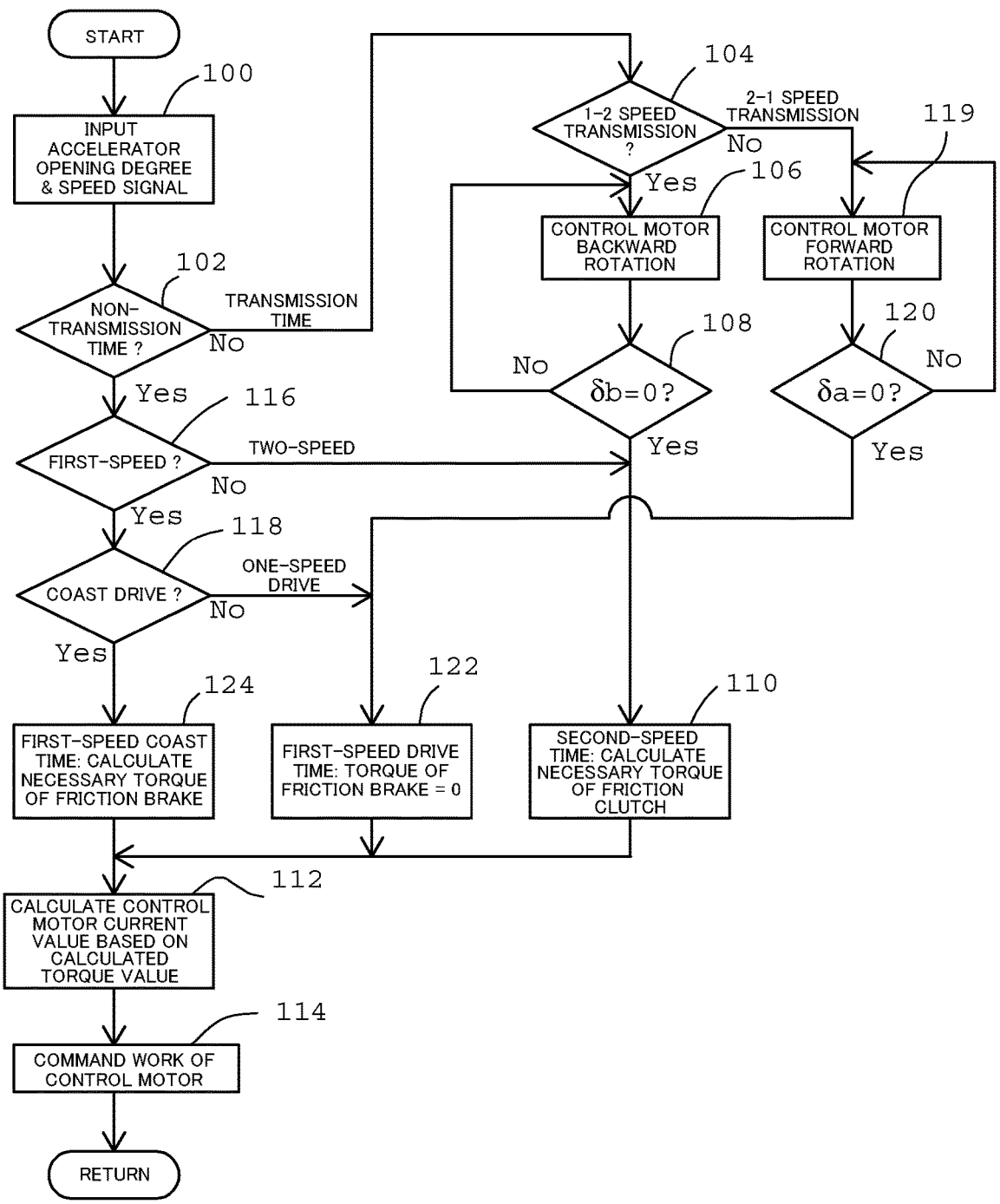
FIG. 10 is a flow chart to show an example operation of a control circuit in a case that the control motor does not include the electromagnetic brake.

In FIG. 10, the Step 100 indicates the inputs of the acceleration opening degree and the vehicle speed for knowing the driving state of the vehicle.

At the step 102, it is judged whether the state is no-transmission time or not based on the acceleration opening degree and the vehicle speed. When the transmission is judged at the Step 100, the operation advances to the Step 104 and then it is judged whether the transmission is from the first speed to the second speed or not. When the transmission from the first speed to the second speed is judged at the Step 104, the pusher 34 is contact (the first speed) with the friction brake 28 as shown in FIG. 6B, and the clearance "b" against the friction clutch 26 is "b=Ccr+Bcr+St" and this is given as the target stroke amount of the pusher 34. In order to transmit to the second speed from this state, it is necessary to move the pusher 34 from the position of FIG. 6B to the left till the clearance against the friction clutch 26 becomes zero or the target stroke amount is obtained so that the friction clutch 26 is fastened by the backward rotation of the control motor 32. At the next Step 106, the output of a control motor current value to move the pusher 34 to the control motor 32 is continued till a deviation δb to the target stroke amount "b" becomes "δb=0" at the Step 108 or the pusher 34 becomes contact with the friction clutch 26 as shown in FIG. 6C. The above control motor current value is as small as possible value to move the pusher 34 as the torque value while the control motor 32 is rotated backward, and is a value not to occur the fastening force in the friction clutch 26. When the deviation "δb=0" is judged at the Step 108, the operation advances to the Step 110 and the fastening force (the torque of the control motor 32) to be necessary to fasten the friction clutch 26 is calculated. The fastening force is converted into the necessary current value at the Step 112 and the current command to the control motor 32 is outputted from the control circuit 47 at the Step 114.

When the transmission operation from the first speed to the second speed is completed as this way, the operation returns to the Steps 100 and 102 on the routine execution shown in FIG. 10. Since the affirmation judgement is performed at the Step 102, the operation advances to Step 116. Since the present state is the second speed, the judgement at the Step 116 is negation and the operation advances to Step 110. The torque being necessary for the control motor 32 to hold the fastening of the friction clutch 26 in the driving state defined by the acceleration opening degree and the vehicle speed inputted at the Step 100, is calculated at the Step 110. The necessary current value is calculated at the Step 112 and the current command (output of the necessary current value calculated at the Step 112) to the control motor 32 is outputted at the Step 114.

At the transmission time from the second speed to the first speed, the operation advances from the Steps 100 and 102 to the Step 104, and then advances to Step 119 since the negation is judged at the Step 104. This time, the pusher 34 is a state that there is no clearance to the friction clutch 26 as shown in FIG. 6C. In order to transmit to the first speed from this state, it is necessary to move the pusher 34 from the position of FIG. 6C to the right by the target stroke amount being "a=Ccr+Bcr+St" till the friction brake 28 is fastened. The output of a control motor current value to move the pusher 34 to the control motor 32 is continued till a deviation δa to the target stroke amount "a" becomes "δa=0" at the Step 120 or the pusher 34 obtains the no-clearance state against the friction brake 28 as shown in FIG. 6B. The above control motor current value is as small as possible value to move the pusher 34 as the torque value while the control motor 32 is rotated forward, and is a value not to occur the fastening force in the friction clutch 26. When the deviation "δa=0" is judged at the Step 120 or the clearance against the friction brake 28 becomes zero, the operation advances to the Step 122 and the torque of the control motor 32 takes zero. Also, the current value becomes zero (the Step 112), and the operation advances to the Step 114 and the command is performed. That is, since the motion power transmission relates to the one-way clutch 27 at the first speed driving state and the friction brake 28 does not relate to the motion power transmission, the torque is taken to zero.

Thus, the transmission operation from the second speed to the first speed is completed (the pusher 34 moves to a position where the clearance against the friction brake 28 is zero) as described above, the operation advances to the Step 118 via the Step 116 from the Steps 100 and 102 at a next routine, and it is judged whether the coast state (the coast state at the first speed) or not at the Step 118. In a case of no-coast state even if the first speed, since the judgement at the Step 118 is a negation, the operation advances to the Step 122 and the torque of the friction brake 28 is kept by remaining zero.

When the driver releases the acceleration pedal and then the driving state becomes the coast drive, the operation advances to the Step 118 via the Steps 100, 102 and 116, and the affirmation is judged at the Step 118 and therefore the operation advances to the Step 118. At the Step 124, the friction torque that the friction brake 28 does not slip is calculated based on the torque of the control motor 32 corresponding to the driving state in the first speed coast state due to the acceleration opening degree and the vehicle speed. Then, the current value of the control motor 32 corresponding to the friction torque is calculated at the Step 112, and the calculated current value is outputted from the control circuit 47 to the control motor 32 at the Step 114. Although the one-way clutch 27 idles in the coast state, the appropriate friction torque is simultaneously applied to the friction brake 28 that already comes to the no-clearance position against the friction brake 28. Accordingly, it is possible to smoothly shift to the coast driving without the deceleration shock.

"The Control of the Actuator (a Case with the Electromagnetic Brake)"

Figure 11:
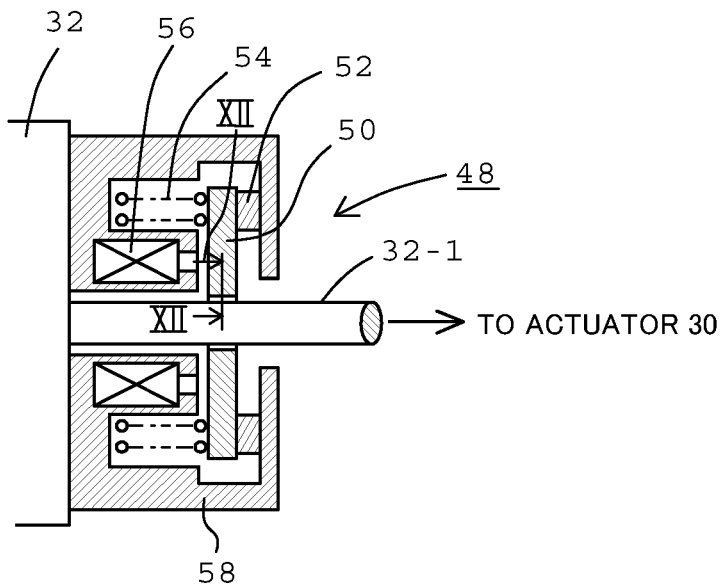
FIG. 11 is a schematic view of the control motor including the electromagnetic brake.
Figure 12:
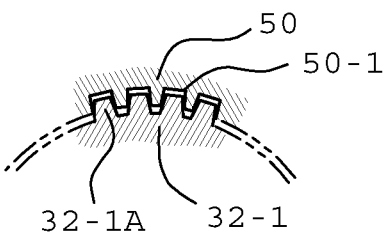
FIG. 12 is a cross-sectional view taken along a XII-XII line of FIG. 11.

In the implement of the present invention, it is possible to adopt the actuator with the electromagnetic brake as the control motor 32 in FIG. 2. By adopting the control motor 32 with the electromagnetic brake, it is possible to fasten the friction brake 28 and the friction clutch 26 without the torque driving of the control motor 32 and to reduce the power consumption of the control motor 32. The electromagnetic brake 48 is mounted on the output axis 32-1 as schematically shown in FIG. 11, and comprises a ring-shaped driving plate 50 made by mildly ferromagnetic material, a ring-shaped brake shoe 52, springs 54 which are plural and are arranged in the circumferential direction and a solenoid (an electromagnetic coil) 56. The output axis 32-1 includes an outer periphery spline 32-1A (FIG. 12), the outer periphery spline 32-1A is fitted into a spline 50-1 of the driving plate 50, and the driving plate 50 is able to slide toward the axial direction against the output axis 32-1 but is fixed against the rotational direction. The fastened state of the electromagnetic brake 48 is obtained by the non-energization (OFF) of the solenoid 56 (refer to FIG. 13). At this time, the driving plate 50 locks the brake shoe 52 to the locking portion 58 of the motor housing side under the urging by the springs 54, and the output axis 32-1 of the control motor 32 is restrained and is suspended.

The non-fastened state of the electromagnetic brake 48 is obtained by the energization (ON) of the solenoid 56 (refer to FIG. 13). At this time, the driving plate 50 is axially displaced to the solenoid 56 side by the electromagnetic force against the spring 54, the restrain of the output axis 32-1 of the control motor 32 by the brake shoe 52 is released, and it is possible to transmit the rotation of the output axis 32-1 of the control motor 32 to the actuator 30 side. Although the output axis 32-1 of the control motor 32 always rotates, the great torque is necessary at only a time to fasten the friction clutch 26 and the friction brake 28, and otherwise the control motor 32 can drive by the minimum torque to be possible to perform the stroke motion of the pusher 34. Thereby, it is possible to reduce the power consumption as a whole.

The operation to switch the first speed and the second speed in a case of the control motor 32 with the electromagnetic brake 48 will be described with reference to flow charts shown in FIGS. 14A and 14B. A principal part of this operation is that the fastening and holding of the friction clutch 26 and the friction brake 28 are performed by the electromagnetic brake 48 without dependence to the torque of the control motor 32. In the below explanation of the flow chart, the same reference numerals (the 100 series) are assigned to the same processing steps in FIG. 10, duplicate description is omitted as possible and is simplified as much as possible, and the operations not being described in FIG. 10 are in details explained by using the reference numerals of the 200 series. After inputting the acceleration opening degree signal and the vehicle speed signal at the Step 100, in a case of the transmission from the first speed to the second speed, the solenoid 56 (FIG. 11) of the electromagnetic brake 48 is energized at the Step 200 and the electromagnetic brake 48 becomes the state being no-fastened (refer to FIG. 13). Thereby, the rotation of the rotational axis 32-1 of the control motor 32 can be transmitted to the actuator 30 side and the operation advances to the Steps 104,106 and 108, and the command to rotate backward is inputted into the control motor 32 in order to move the pusher 34 toward the left from the position contacting with the friction brake 28 in FIG. 6B. When the state of FIG. 6C that the pusher 34 contacts with the friction clutch 26 (thrust bearing 26-3) is obtained, or when the movement of the target stroke "b" of the pusher 34 for the transmission to the first speed is completed, the affirmation (δb=0) is judged at the Step 108 and then the processing of the respective Steps 110, 112 and 114 described above is performed. In this way, the necessary torque of the control motor 32 is calculated and the fastening of the friction clutch 26 is performed by using the necessary torque.

As stated above, when the transmission operation to the second speed is completed by obtaining the necessary torque to fasten the friction clutch 26, the operation advances to the Step 202 via the Steps 100 and 102 at a right after routine and then the fastening of the electromagnetic brake 48 is judged at the Step 202. The operation advances to the Step 204 since the electromagnetic brake 48 is not fastened at first (the solenoid 56 is energized (ON) at the Step 200), and the electromagnetic brake 48 is fastened (the solenoid 56 is demagnetized (OFF)). The fastening of the electromagnetic brake 48 restrains the output axis 32-1 of the control motor 32, and it is possible to keep the fastening state of the friction clutch 26 fastened as shown in FIG. 6C irrespective of the rotational torque of the control motor 32. It is judged at the next Step 206 whether the state is now the first speed or not, and the operation advances to the Step 208 since the current state is the second speed. At the Step 208, it is judged whether the gear ratio of the second speed is abnormal or not. That is, the pusher 34 keeps the contacting state to the friction clutch 26 as shown in FIG. 6C if the fastening torque of the friction clutch 26 due to the fastening of the electromagnetic brake 48 is normal, and the pusher 34 breakthroughs from the fastening state and then shifts to the friction brake 28 side if the fastening torque falls. In this connection, it is possible to judge the abnormality based on the detecting position of the output axis 32-1 of the control motor 32. The operation advances to the Step 210 if the gear ratio of the second speed is not abnormal, and it is judged at the Step 210 whether an elapsed time from the last fastening of the electromagnetic brake 48 is a predetermined time Tsec or not. If the elapsed time is less than the predetermined time Tsec, the operation loops to the Step 208 and the fastening state of the friction clutch 26 due to the electromagnetic brake 48 is kept. In a case judged at the Step 208 that the elapsed time from the last fastening of the electromagnetic brake 48 is more than the predetermined time Tsec or the gear ratio of the second speed is abnormal, the operation advances to the Step 212. The electromagnetic brake 48 is temporarily released (the solenoid 56 is energized (ON)) at the Step 212, and the working command is inputted into the control motor 32 in order to obtain the maximum torque to the backward rotation (the left-direction movement to reduce the clearance between the pusher 34 and the friction clutch 26 in FIG. 6C) at the Step 214. At the next Step 215, even if the friction clutch 26 is temporarily broken through, the time $\tau_{sec}$ being necessary to again return to the fastening state is waited. FIG. 13 schematically shows the re-grasp operation of the friction clutch 26 at the second speed, and the electromagnetic brake 48 is released at every time Tsec and the backward rotation (the continue time τ) is performed at the maximum torque of the control motor 32. Further, even if the waiting time does not reach the time Tsec, the re-grasp of the friction clutch 26 is simultaneously performed if the abnormality of the gear ratio of the second speed is judged at the Step 208.

In a case of the transmission time from the second speed to the first speed, the electromagnetic brake 48 is not fastened at the Step 200 via the Step 100 and 102. Thereby, it is possible to transmit the rotation of the control motor 32 to the actuator 30, and then the operation advances to the Steps 104,118 and 120. The movement to the right (the control motor 32 rotates forward) is started by the working command of the control motor 32 from the state of FIG. 6C contacting with the friction clutch 26 which is the current position of the pusher 34. Then, the movement of the target value "a" of the pusher 34 for the transmission to the first speed is completed and the deviation becomes "δa=o". When the friction brake 28 becomes the fastening state, the torque value is set to zero at the Step 122. The operation advances to the Steps 112 and 114, the current is commanded to zero. Although the clearance of the pusher 34 to the friction brake 28 is zero, the torque applying on the friction brake 28 becomes zero.

In this way, when the transmission operation is completed, by the processing of the above Steps 202 and 204 via the Steps 100 and 102, the electromagnetic brake 48 is fastened (the solenoid 56 is not energized (OFF)), and the clearance of the friction brake 28 to pusher 34 becomes zero and the state that the torque applying on the friction brake 28 is zero is maintained. At the next Step 206, the affirmation is judged since the current state is the first speed, and the operation advances to the Step 216 and then the abnormality of the gear ratio in the first speed is judged. That is, in a case that the gear ratio in the first speed is normal, the state is judged as the contacting state with the friction brake 28 when the holding position of the pusher 34 to the friction brake 28 by the electromagnetic brake 48, and the gear ratio in the first speed can be judged as the abnormality based on the detected values of the rotational axis 32-1 of the control motor 32 when the position of the pusher 34 shifts to the friction clutch 26 side due to the breakthrough from the contacting state with the friction brake 28. The operation advances to the Step 218 when the gear ratio in the first speed is not abnormal, and it is judged at the Step 218 whether the elapsed time from the last fastening of the electromagnetic brake 48 is the predetermined time Tsec or not. If the elapsed time is less than the predetermined time Tsec, the operation loops to the Step 216. In a case judged that the elapsed time from the last fastening of the electromagnetic brake 48 is more than the predetermined time Tsec at the Step 216 or the gear ratio of the first speed is abnormal at the Step 216, the operation advances to the step 220. The electromagnetic brake 48 is released (the solenoid 56 is energized at the Step 220, and restraining state by the electromagnetic brake 48 of the rotational axis 32-1 of the control motor 32 is released. The current value to obtain the maximum torque to the forward rotation (the right direction to reduce the clearance between the pusher 34 and the friction brake 28 in FIG. 6C) of the control motor 32 is calculated at the Step 222. The calculated current is inputted into the control motor 32 till the time elapses the predetermined time Tsec. The re-grasp operation of the friction brake 28 is also the same with FIG. 13, and the electromagnetic brake 48 is released at every time Tsec and the forward rotation (the continue time τ) is performed at the maximum torque of the control motor 32. Further, even if the elapsed time does not reach the time Tsec, the re-grasp of the friction brake 28 in the first speed coast drive is simultaneously performed if the abnormality of the gear ratio of the first speed is judged at the Step 216.

In the control shown in FIGS. 13 and 14, the friction brake 28 is fastened by fastening the electromagnetic brake 48 at the first speed irrespective of the first speed driving state and the coast state, and the control fastening the friction brake 28 is not worked in the coast state shifting time as the embodiment shown in FIG. 10. Consequently, it is possible to simplify the control and to save the power. Further, it is possible to enhance the driving property since feeling of deceleration is given to the driver. That is, in this control, although the friction brake 28 is fastened and kept at the first speed irrespective of the drive and the coast, the friction brake 28 becomes the no-fastening state during the re-grasp (the time r in FIG. 13), and further the one-way clutch 27 is fastened so as to secure the motion power transmission during the no-fastening state of the friction brake 28.

Figure 14A:
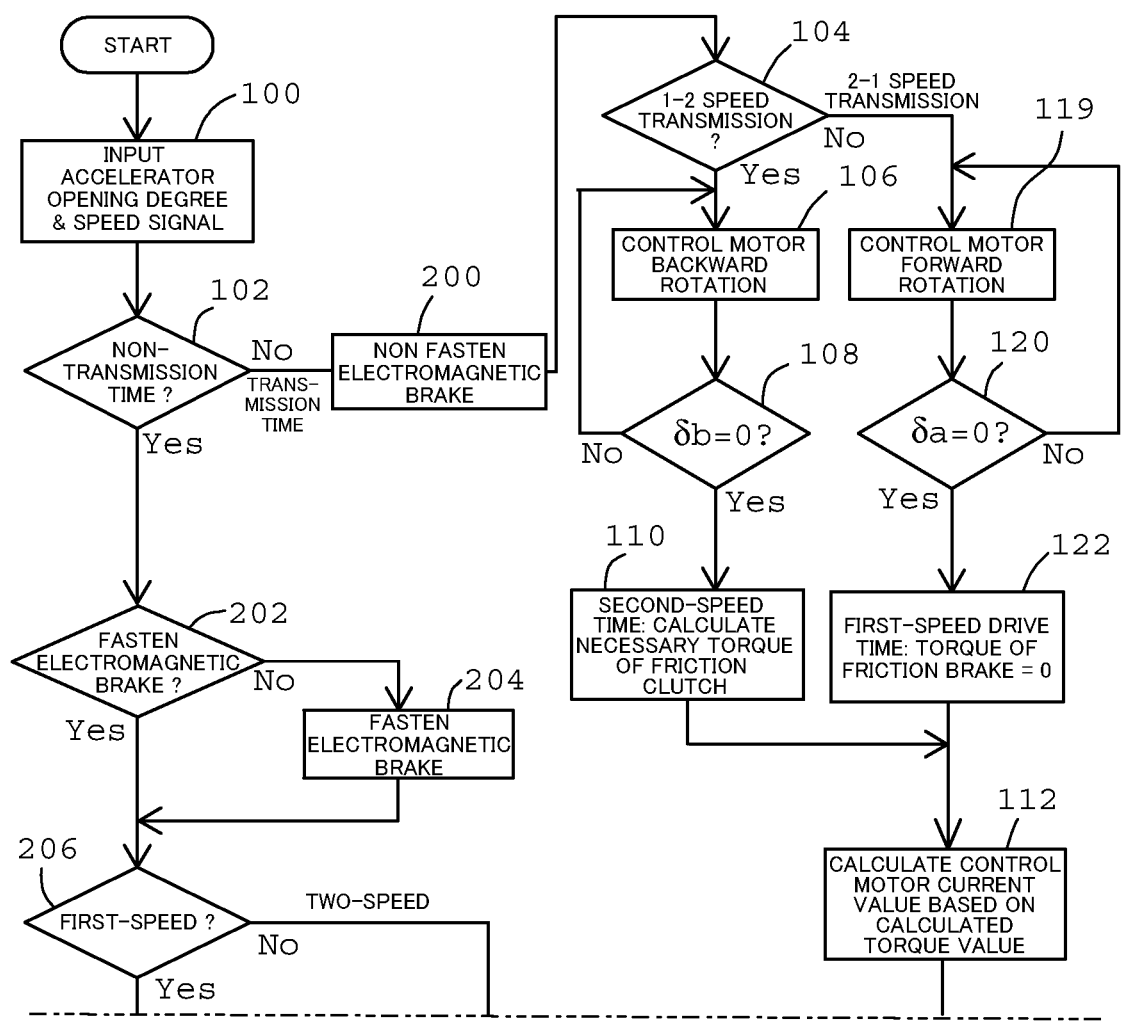
FIG. 14A is a part of a flow chart to show an operation of the control circuit in a case that the control motor includes the electromagnetic brake.
Figure 14B:
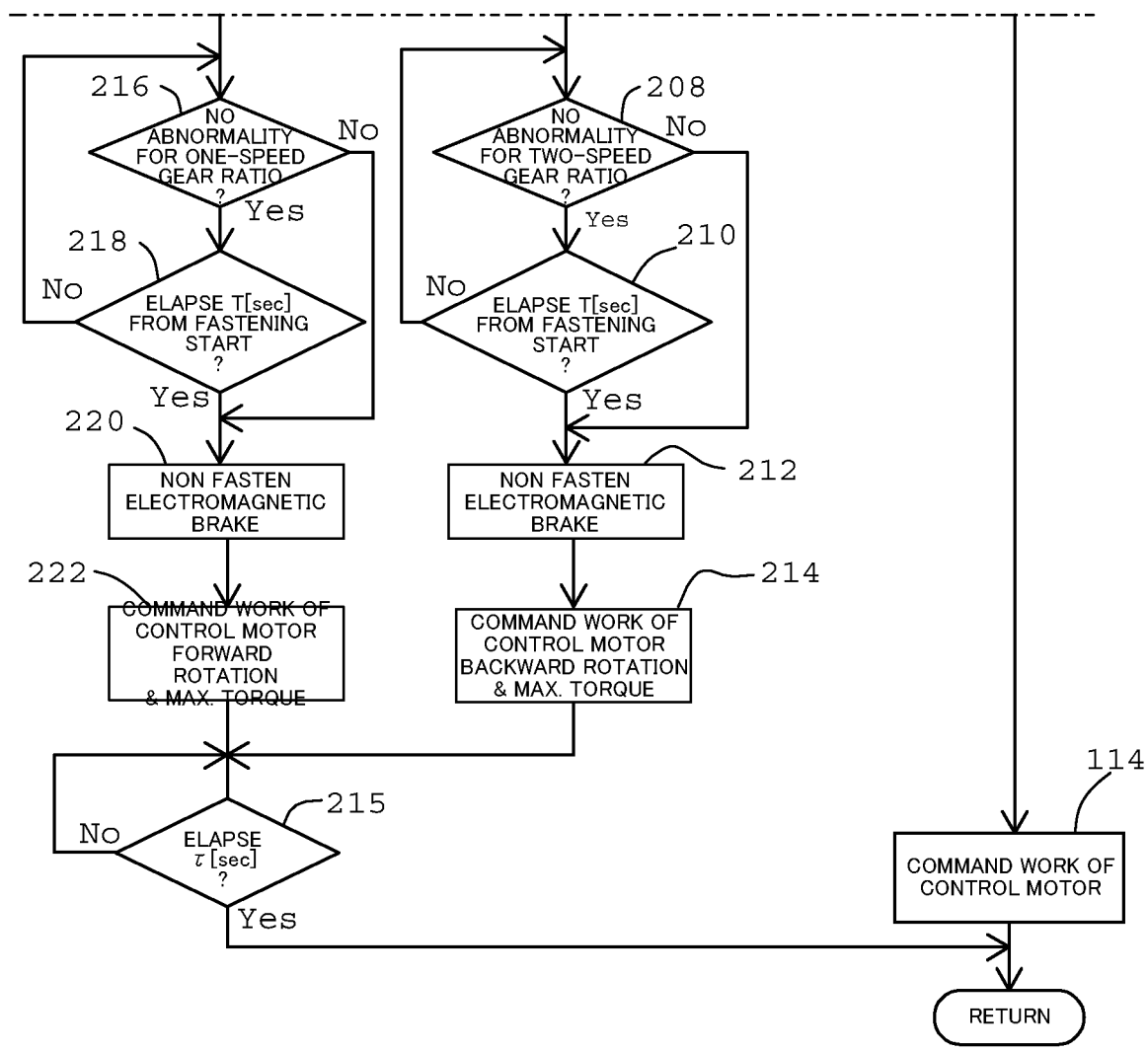
FIG. 14B is a rest part of a flow chart continuing from FIG. 14A.

In the above operation of the control motor 32 with the electromagnetic brake 48 explained by the flow charts of FIGS. 14A and 14B, it is possible to realize the power saving since the rotational torque of the control motor 32 is the minimum and the solenoid 56 of the electromagnetic brake 48 is not energized by keeping the fastening state of the friction brake 28 at the first speed coast and by keeping the fastening state of the friction clutch 26 at the second speed by using the electromagnetic brake 48. Further, the re-grasp operations of the friction clutch 26 and the friction brake 28 are only matters that the solenoid 56 of the electromagnetic brake 48 is energized (ON) and the control motor 32 becomes the maximum torque for an instant (τ) that the electromagnetic brake 48 is released (refer to FIG. 13). Therefore, it is possible to collateralize the certainty of the fastening and keeping operation of the friction clutch 26 and the friction brake 28 by the electromagnetic brake 48 without substantially damaging the total power saving.

In the implement of the present invention, as shown by the flow charts of FIGS. 14A and 14B, for the electromagnetic brake 48, the construction shown in FIG. 11 that the solenoid 56 is energized and excited when the electromagnetic brake 48 is released (when the torque of the control motor 32 is transmitted to the actuator 30) and solenoid 56 is not energized when the electromagnetic brake 48 is fastened (at the driving time when the fastened torque is kept), is preferable in a view of the power consumption saving. However, it is, depending on the case, possible to adopt the electromagnetic brake that is not fastened at the no-energizing time of the solenoid 56 and is fastened by energizing the solenoid 56.

"The Actual Device Construction of the Two-Speed Transmission Apparatus"

Figure 15:
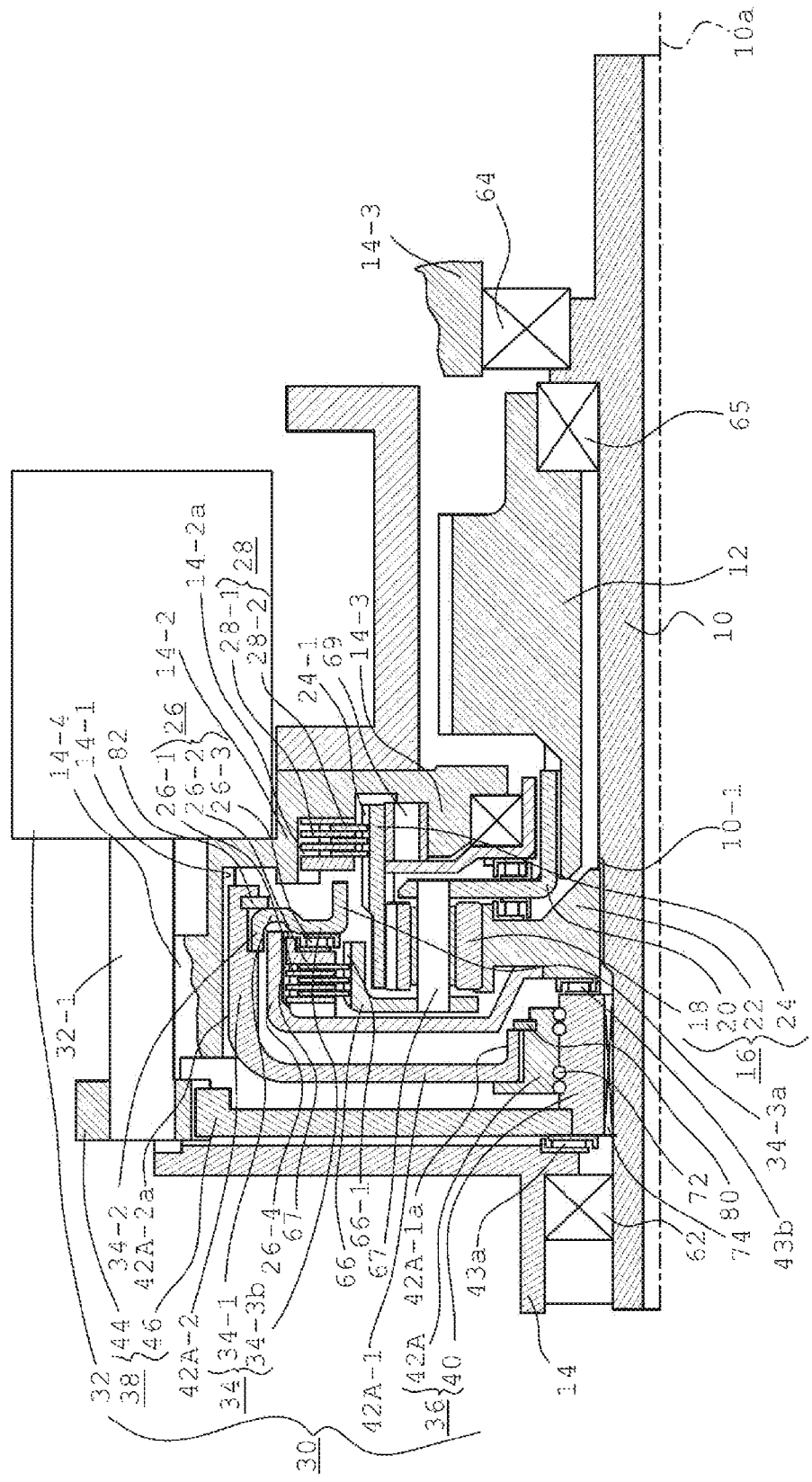
FIG. 15 is cross sectional view of the construct in which the two-speed transmission apparatus shown in FIG. 2 is implemented in a real machine.

FIG. 15 shows an example of the actual device of the two-speed transmission apparatus 4 shown in FIG. 2, and the same reference numerals in FIG. 2 are assigned to the same functional members. A center axis line of the input axis 10 is shown by "10a", and the input axis 10 is supported at the both ends by angular contact ball bearings 62 and 64 of the upright wall part 14-1 of the housing 14. The cylindrical output axis 12 is supported by the angular contact ball bearing 65 and so on in coaxial with the input axis 10. The planetary gear mechanism 16 comprises the carrier 20 and the sun gear 22, the carrier 20 is meshed with the sun gear 22 inside, and the pinion 18 meshing with the ring gear 24 outside is pivotally supported by the pinion pin 67. The sun gear 22 is fitted into the input axis 10 and the spline 10-1 in the inner circumstance side and is integrally rotated with the input axis 10.

The friction clutch 26 comprises an inner drum 66 to integrally rotate with the carrier 20 and the pinion pin 67, a driven plate 26-2 to spline-fit into the spline 66-1 of the inner drum 66, an outer drum 26-4 (structure being fixed to the sun gear 22) to integrally rotate with the sun gear 22, a drive plate 26-1 (which configures a clutch back with the driven plate 26-2) to alternately arrange the driven plate 26-2, and a thrust bearing 26-3 which is arranged at the most far position from the outer drum 68 of the clutch back.

The friction brake 28 comprises a driven plate 28-2 to spline-fit into the outer circumstance spline 24-1 of the ring gear 24 serving the inner drum, an outer drum portion 14-2 witch is an integral connecting portion of a part (the housing 14 of FIG. 2) of the housing, and a drive plate 28-1 (which configures the clutch back with the driven plate 28-2) which is spline-fitted into an inner circumference spline 14-2a of the outer drum portion 14-2 and is alternately arranged to the driven plate 28-2 toward the axial direction.

The one-way clutch 69 is arranged between the inner circumference of the ring gear 24 and the outer circumference of an inner circumference-side ring-shaped convex part 14-3 formed on the outer drum 14-2 being an integral part of the housing 14 (FIG. 2) of the friction brake 28. Since the arrangement of the inner circumference and outer circumference is inverted for the one-way clutch 27 shown in FIG. 3, the operation itself of the one-way clutch 69 is not different from that of the one-way clutch 27 but the lock and the direction are reverse.

The actuator 30 to switch the friction clutch 26 and the friction brake 28 comprises the control motor 32, the pusher 34, the torque-thrust converting mechanism 36 and the rotational power transmission mechanism 38. The rotational power transmission mechanism 38 comprises the driving spur gear 44 and the driven spur gear 46. The torque-thrust converting mechanism 36 comprises the cylindrical screw 40 (the inside diameter member) and the cylindrical nut 42A to be screwed with the cylindrical screw 40. The cylindrical nut 42A is only a screw portion to the cylindrical screw 40 in this embodiment and functions as the outside diameter member of the present invention by integrating as the double cylinder described below. The cylindrical nut 42A restrains the rotation and is integrally connected to form the double cylinder including the disc portion 42A-1 and the cylindrical portion 42A-2 to be able to slide for the housing 14. For integrating the cylindrical nut 42A, the disc portion 42A-1 is fitted into the outer circumference spline of the cylindrical nut 42A at the inner circumference spline hole of the lower end flange portion 42A-1a and is fixed to the cylindrical nut 42A by the snap ring 80, thereby the cylindrical nut 42A is integrated as the double cylinder. In this actual device structure, the screwing between the cylindrical screw 40 and the cylindrical nut 42A is performed via balls 72 provided in the infinite circulation path and is well known ball-nut mechanism (FIG. 15 is brief and refer to the detail FIG. 16). The cylindrical screw 40 is rotatably supported to the input axis 10 by the push 74, and the thrust bearings 43a and 43b are provided at the both ends for the thrust reception. The pusher 34 is the pressed formed-parts of ring-shape from a plate member, and the outer circumference cylindrical portion 34-2 is movable toward the axial direction by the spline-fitting into the cylindrical portion 42-2 of the cylindrical nut 42 but is restrained for the rotational direction. Further, the outer circumference cylindrical portion 34-2 is locked at the snap ring 82, the pusher 34 is integrally connected with the cylindrical nut 42A, and thus the cylindrical nut 42A due to the rotation of the cylindrical screw 40 and also pusher 34 are able to move (the thrust transmission) toward the axial direction. The pusher 34 is formed at the ring-shape convex portion where the intermediate portion of the radial direction opposite to the friction clutch 26 via the thrust bearing 26-3, and the convex portion functions as the friction clutch driving portion 43-3b (refer to FIG. 6). Further, the inner end portion in the axial direction of the pusher 34 is formed so as to extend toward the friction brake 28 in the axial direction, and the axial direction extended portion functions as the friction brake driving portion 34-3a. Thereby, it is possible to switch the friction clutch 26 and the friction brake 28 by the left-right movement of the pusher 34 in the axial direction movement.

In the construction shown in FIG. 15, since the support of the input axis 10 to the housing is performed by the angular ball contact bearings 62 and 64 at the both ends, it is possible to easily and securely obtain the centering of the input axis 10 with the sufficient accuracy, and further it is possible to securely perform the rolling support of the cylindrical screw 40 on the inner circumference side in the torque-thrust converting mechanism 36 for the input axis 10 by the simple mechanism being the push 74. Regarding the movement limit of the left-right in the axial direction of the cylindrical nut 42A on the outer circumference side, it is also possible to obtain a sufficient anti-thrust function by the supporting structure being the simple thrust bearings 43a and 43b. Accordingly, it is possible to secure the long-term stable operation of the torque-thrust converting mechanism 36 to switch the friction clutch 26 and the friction brake 28 without the excessive cost up while the axis size of the torque-thrust converting mechanism 36 is suppressed.

Figure 16:
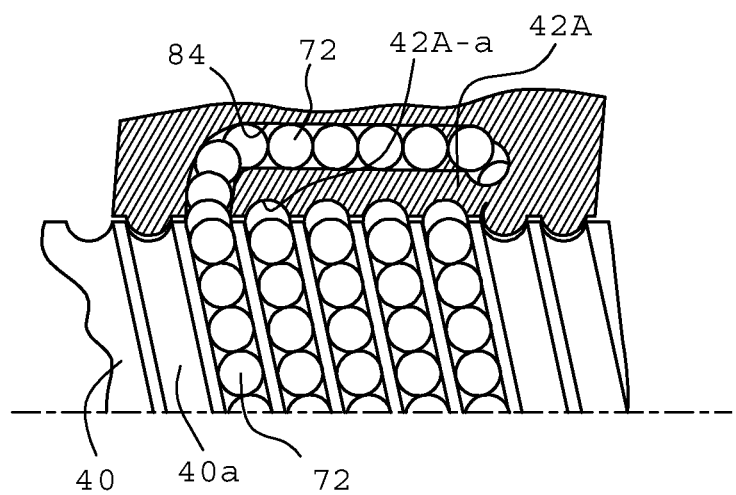
FIG. 16 is a schematic view showing a ball screw mechanism shown in FIG. 15.

The details of the ball-nut mechanism are shown in FIG. 16 as an example, the balls 72 are, in close connection status each other, arranged between the outer screw strips 40a of the cylindrical screw 40 to form the infinite circulation orbit and the inner screw strips 42A-2 of the cylindrical nut 42A, and the circulation path 84 is formed in the cylindrical nut 42. The circulation path 84 is provided in an angle region of about 180 degree of the cylindrical nut 42A and is opened to the tangent direction of the screw strips contained the balls 72. The opening works as a ball discharge section or the ball introducing section in accordance with the rotational direction, and it is possible to configure the infinite circulation orbit for the balls 72. The above ball-nut mechanism is an example, it is possible to adopt appropriate goods that is marketed.

"The Embodiment Provided a Swing Arm-Type Actuator for the Two-Speed Transmission Apparatus"

Figure 17:
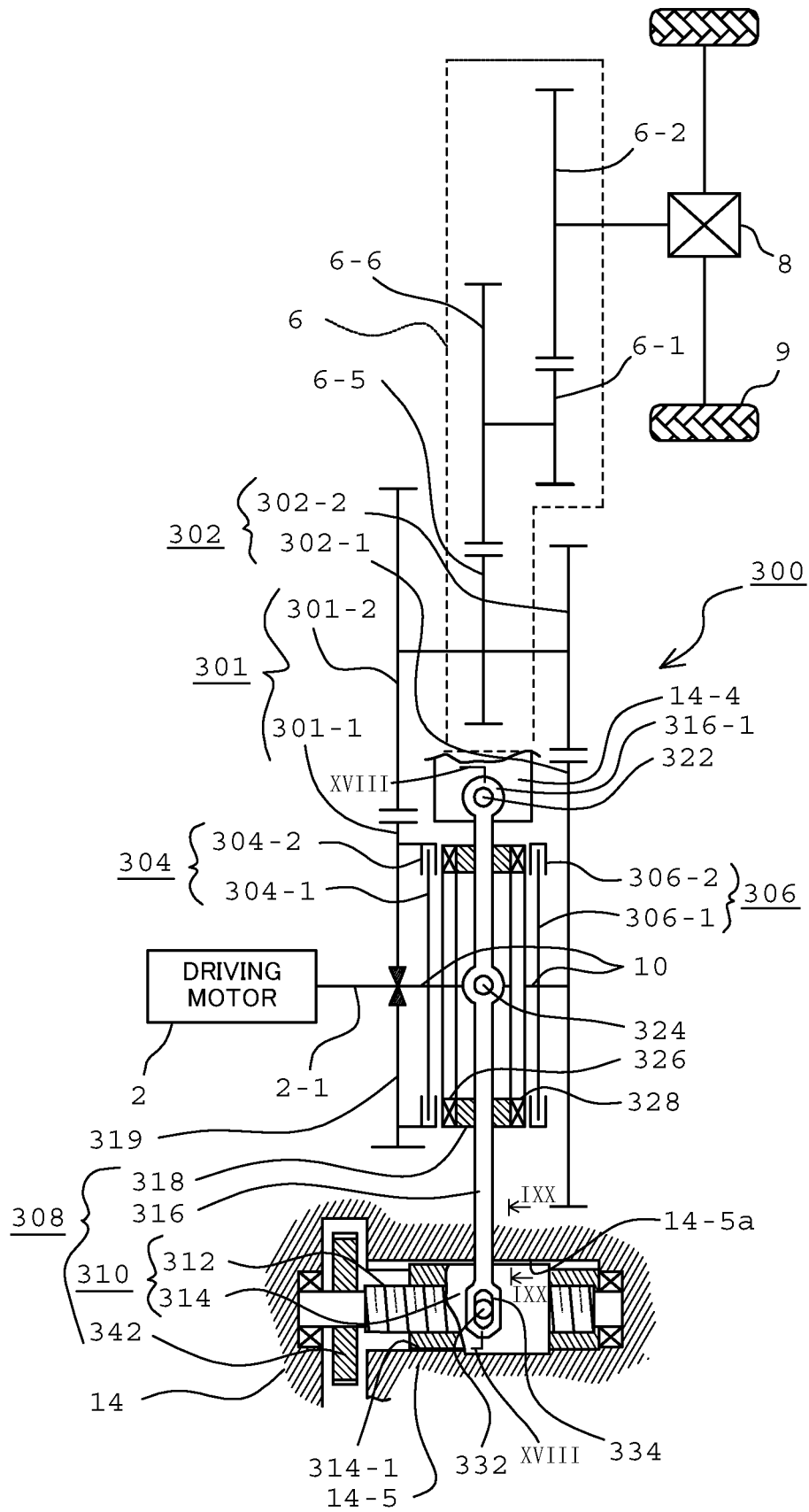
FIG. 17 is a skeleton view to schematically show a whole structure of the two-speed transmission apparatus to switch the first speed and the second speed by a swing arm.
Figure 18:
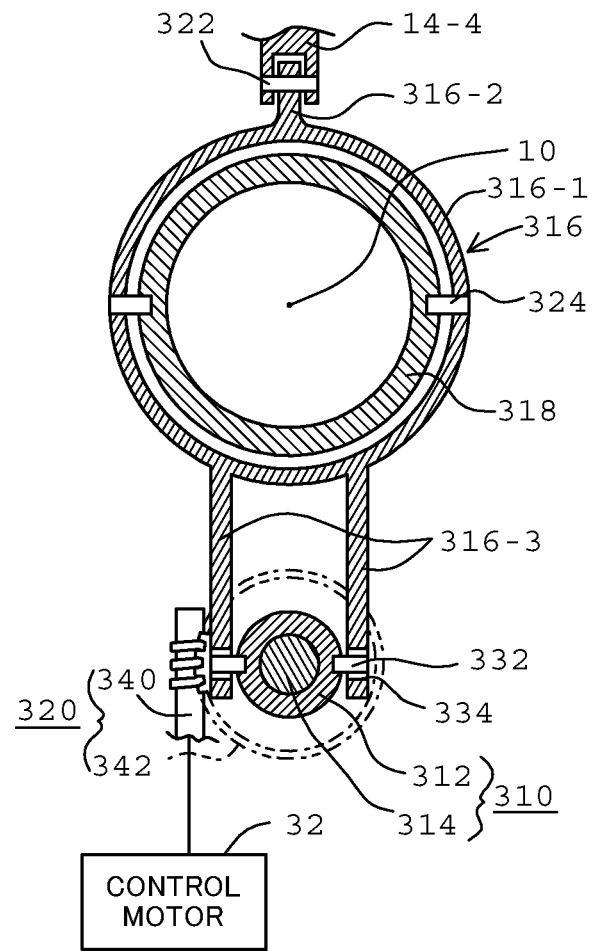
FIG. 18 is a schematic plane view (taken along a XVIII-XVIII line of FIG. 17) of the spline engagement of the swing arm.
Figure 19:
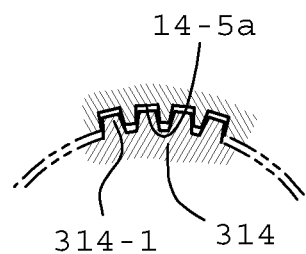
FIG. 19 is a schematic view (taken along a IXX-IXX line of FIG. 17) of the spline engagement of the screw member and the nut member.

FIGS. 17 to 19 show an embodiment provided a spur gear-type two-speed transmission mechanism 300 instead of the planetary gear mechanism for the two-speed transmission and the embodiment performs the clutch switching by using the swing arm-type actuator. The same reference numerals are assigned to the same members and the functional parts. The spur gear-type two-speed transmission mechanism 300 achieves the function to transmit the rotation of the electric driving motor 2 to the wheels 9 with the transmission ratio corresponding to the vehicle speed via the reduction unit 6 and the differential gears 8. The spur gear-type two-speed transmission mechanism 300 comprises the first speed gear set 301 and the second speed gear set 302. The first speed gear set 301 comprises a pair of an input-side spur gear 301-1 and an output-side spur gear 301-2 meshing each other, and the second speed gear set 302 comprises a pair of an input-side spur gear 302-1 and an output-side spur gear 302-2 meshing each other. As described in the embodiment shown in FIG. 2, including the gear ratio of the reduction unit 6, the gear ratio between the input-side spur gear 301-1 and the output-side spur gear 301-2 in the first speed gear set 301 is set to a predetermined gear ratio at the first speed (the low vehicle speed), and the gear ratio between the input-side spur gear 302-1 and the output-side spur gear 302-2 in the second speed gear set 302 is also set to a predetermined gear ratio at the second speed (the high vehicle speed) so as to drive the wheels 9 by the driving motor 2.

The spur gear-type two-speed transmission mechanism 300 further includes a friction clutch for first speed gear 304 serving as the multi-plate clutch and a friction clutch for second speed gear 306, which is separately and coaxially arranged on the transmission-apparatus input axis of the rotational axis 2-1 of the driving motor 2, serving as the multi-plate clutch. A drive side clutch plate 304-1 being fixed for the rotational connection is provided on the output axis 2-1 of the friction clutch for first speed gear 304, and a driven side clutch plate 304-2 being fixed for the rotational connection is provided on the input-side spur gear 301-1 of the first speed gear set 301. In the friction clutch for second speed gear 306, a drive side clutch plate 306-1 being fixed for the rotational connection is provided on the input axis 10 of the transmission apparatus, and a driven side clutch plate 306-2 being fixed for the rotational connection is provided on the input-side spur gear 302-1 of the second speed gear set 302.

The actuator 308 is provided to switch the friction clutch for first speed gear 304 and the friction clutch for second speed gear 306. The actuator 308 includes the control motor 32 (FIG. 18) being an electric rotational motor, this is the same with embodiment shown in FIGS. 1 to 16. In the present embodiment, the actuator 308 includes the torque-thrust converting mechanism 310 to convert the rotational torque of the control motor 32 to the thrust and is functionally common to the torque-thrust converting mechanism 36 shown in FIGS. 1 to 16. However, the torque-thrust converting mechanism 310 comprises a screw member 312 (the inside diameter member of the present invention) of inner diameter side and a nut member 314 (the outside diameter member of the present invention) of outer diameter side. The actuator 308 further comprises a swing arm 316 (the thrust transmission member of the present invention) to transmit the thrust, a ring-shape pusher 318 (the pressure member of the present invention) to selectively fasten the friction clutch for first speed gear 304 and the friction clutch for second speed gear 306, and the control motor 320 to transmit the rotation of the control motor 32 to the torque-thrust converting mechanism 310.

At a neutral state as shown in FIG. 18, the swing arm 316 forms a ring-shape body portion 316-1 being coaxial to the transmission apparatus input axis 10, an upper-end tongue portion 316-2 on the upper end of the ring-shape body portion 316-1, and a pair of ear portions 316-3 to extend to downward in parallel to the upper-end tongue portion 316-2 from the ring-shape body portion 316-1 at an opposite position of the upper-end tongue portion 316-2. The upper-end tongue portion 316-2 of the swing arm 316 is pivotally connected to the housing 14 (an arm pivotally connecting portion 14-4) by an arm supporting pin 322, the swing arm 316 is swingable constituted around a center axis line of the arm supporting pin 322 being the transmission-apparatus center axis line (parallel to the paper surface in FIG. 17) or a rotational center (orthogonal to the paper surface in FIG. 17) being orthogonal to the transmission-apparatus center axis line. A pair of the pusher supporting pins 324 are arranged at a diameter opposite position as shown in FIG. 17, and inner end portion of the pusher supporting pin 324 is fitted into the pusher 318 from the outer circumference and the outer end portion is fitted into the ring-shape body portion 316-1 of the swing arm 316. Thereby, the pusher 318 is supported, being swingable, for the swing arm 316 with some angle around the center axis line being orthogonal to the transmission-apparatus center axis line. In this connection, the pusher 318 is able to switch the friction clutch for first speed gear 304 and the friction clutch for second speed gear 306 by the above supporting structure of the swing arm 316. That is, by rotating the swing arm 316 to the clock wise (CW) from the orthogonal position shown in FIG. 17 at the center of the arm supporting pin 322, the pusher 318 is driven toward the friction clutch for first speed gear 304 and then the friction clutch for first speed gear 304 is fastened via the thrust bearing 328. Contrarily, by rotating the swing arm 316 to the counter-clock wise (CCW), the pusher 318 is driven toward the friction clutch for second speed gear 306 and then the friction clutch for second speed gear 306 is fastened via the thrust bearing 328. In the above operation to switch the friction clutch for first speed gear 304 and the friction clutch for second speed gear 306, the pusher 310 has firstly somewhat inclination due to the rotational structure around the pusher supporting pin 320. However, the posture of the pusher 310 to the swing arm 316 is finally corrected due to the rotational supporting structure of the pusher 310 to the swing arm 316 by the pusher supporting pin 324, and the pusher 310 can engage to the opposite surface at an upright posture.

The screw member 312 of inner diameter side and the nut member 314 of outer diameter side to constitute the torque-thrust converting mechanism 310 are positioned at opposite sides of the fulcrum against the housing of the swing arm 316 across the friction clutch for first speed gear 304 and the friction clutch for second speed gear 306. In this embodiment, the screw member 312 is a solid bar-shape and extends in parallel to the center axis lines of the clutches 304 and 306, and both ends of the screw member 312 are rotatably supported to the housing by the bearings 330. The screw member 312 and the nut member 314 a real so able to constitute as the ball screw in similar to FIG. 16. By that the outer circumference spline 314-1 of the nut member 314 is fitted into spline hole 14-5a at the nut mounting portion 14-5 while blocking the rotation as shown in FIG. 19, the rotation of the screw member 312 is converted into the straight movement in the axial direction of the nut member 314. In order to obtain the swing motion of the swing arm 316 from the straight motion of the nut member 314, the cylindrical nut member 314 implants and fixes the driving pins 332 at a diameter opposite position in the intermediate portion in the longitudinal direction as shown in FIGS. 17 and 18. On the other hand, pin holes 334 extending in the longitudinal direction of the arm 316 are formed on the ear portion 316-3 of the swing arm 316, and free ends of the driving pin 332 from the nut member 314 are loose-fitted into the pin holes 334. At the neutral position of the swing arm 316 shown in FIGS. 17 and 18, the pin hole 328 leaves up and down a margin against the driving pin 332, and this margin part realizes the rotation of the swing arm 316 with the back and forth straight movement in the axial direction of the screw member 312 due to the rotation of the central screw 314 and thus realizes the switch operation of the friction clutch for first speed gear 304 and the friction clutch for second speed gear 306 based on the back and forth movement of the pusher 318.

In this embodiment, the motion power transmission mechanism 320 to transmit the rotation of the control motor 32 to the central screw 314 comprises a worm gear 340 being connected to the rotational axis of the control motor 32 and a worm wheel 342 which is fixed on the central screw 314 and meshes with the worm gear 340 as shown in FIG. 18. The rotation of the control motor 32 is transmitted to the central screw 314 via the worm gear 340 and the worm wheel 342 meshing each other, and the nut member 314 is moved to the axial direction by the rotation of the central screw 312. The axial direction movement of the nut member 314 causes the swing motion of the arm 316, and thus it is possible to realize the switch of the friction clutch for first speed gear 304 and the friction clutch for second speed gear 306.

A one-way clutch 348 is provided between an input side (the driving motor 2 side) and an output side (the input side of the first speed gear set 301) of the friction clutch for first speed gear 304. The operation of the one-way clutch 348 is the same with the flow chart of FIG. 9, the one-way clutch 348 is locked and the fastening torque of the friction clutch for first speed gear 304 is zero in the first speed drive, and the torque of the driving motor 2 is transmitted to the first speed gear set 301 via the one-way clutch 348. Further, at the first speed coast, the fastening torque is applied on the friction clutch for first speed gear 304, and the idling of the one-way clutch 348 is blocked.

In this embodiment, since the screw member 312 of the inner diameter side is solid, it is possible to further miniaturize the torque-thrust converting mechanism 310 and to make the cost down. Further, since it is possible to keep the axial force of the screw member 312 by a self-lock function of the worm gear 320, the electromagnetic brake 48 described in FIG. 11 and FIGS. 14A and 14B becomes unnecessary and thus the advantage on the cost is obtained.

"The embodiment provided an independent actuator for the two-speed transmission"

Figure 20:
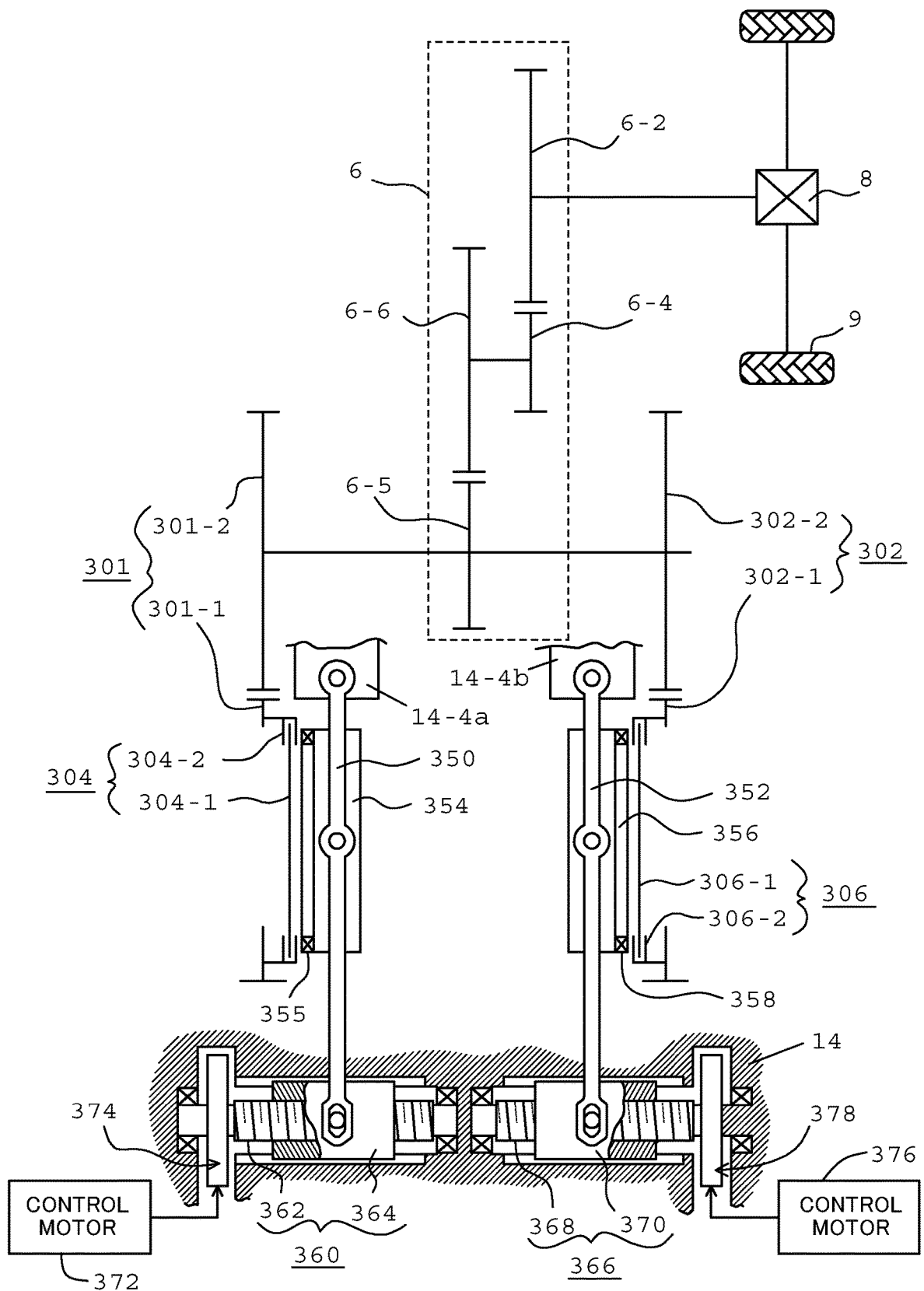
FIG. 20 is a skeleton view to schematically show a whole structure of the two-speed transmission apparatus to switch the first speed and the second speed by two pairs of swing arms.

FIG. 20 shows a modification of the embodiment shown in FIGS. 17 to 19, and a feature of the modification resides in that the actuator is independent for the friction clutch for first speed gear 304 and the friction clutch for second speed gear 306 and uses the friction clutch driving arm for first speed gear 350 and the friction clutch driving arm for second speed gear 352 which are exclusive. The basic structure of the friction clutch driving arm for first speed gear 350 and the friction clutch driving arm for second speed gear 352 is the same with the swing arm 316 in the embodiment shown in FIGS. 17 to 19. However, there are differences between them described below:

(i) The first speed gear pusher 354 (and a thrust bearing 355) is supported to the friction clutch driving arm for first speed gear 350, and the second speed gear pusher 356 (and the thrust bearing 358) is supported to the friction clutch driving arm for second speed gear 352.

(ii) An exclusive torque-thrust converting mechanism 360 (comprising a central screw 362 and a nut 364) is provided for the swing of the friction clutch driving arm for first speed gear 350, and an exclusive torque-thrust converting mechanism 366 (comprising a central screw 368 and a nut 370) is provided for the swing of the friction clutch driving arm for second speed gear 352.

(iii) A rotational control motor 372 and a worm mechanism 374 for the torque-thrust converting mechanism 360 which is exclusive for the friction clutch for first speed gear 304, and a rotational control motor 376 and a worm mechanism 378 for the torque-thrust converting mechanism 366 which is exclusive for the friction clutch for second speed gear 306.

In this embodiment, since the exclusive actuators (the friction clutch driving arm for first speed gear 350 and the friction clutch driving arm for second speed gear 352) are provided for the friction clutch for first speed gear 304 and the friction clutch for second speed gear 306, it is possible to design to eliminate a free running time when the friction clutch for first speed gear 304 and the friction clutch for second speed gear 306 is switched, and the one-way clutches 27 (eg. FIG. 2) and 69 (FIG. 15) become unnecessary and thus an advantage for the reducing of the transmission shock is obtained. Further, it is possible to miniaturize the control motor since the free running time at the switch time does not exist and the movement distance shortening.

EXPLANATION OF REFERENCE NUMERALS 2 electric motor
4 two-speed transmission apparatus
10 input axis
12 output axis
14 housing
16 planetary gear mechanism
20 carrier
22 sun gear
24 ring gear
26 friction clutch
28 friction brake
30 actuator
32 control motor
32-1 output axis of control motor
34 pusher
34-3a friction brake driving portion
34-3b friction clutch driving portion
36 torque-thrust converting mechanism
38 rotational (motion) power transmission mechanism
40 cylindrical screw (inside diameter member of the present invention)
42 cylindrical nut (outside diameter member of the present invention)
43a, 43b thrust bearing
44 driving spur gear
46 driven spur gear
48 electromagnetic brake
52 brake shoe
a target stroke amount of pusher for 2-1 transmission
b target stroke amount of pusher for 1-2 transmission
300 spur gear-type two-speed transmission mechanism
301 first speed gear set
301-1 input-side spur gear
301-2 output-side spur gear
302 second speed gear set
302-1 input-side spur gear
302-2 output-side spur gear
304 friction clutch for first-speed gear
306 friction clutch for second-speed gear
308 actuator
310 torque-thrust converting mechanism
312 screw member (inside diameter member of the present invention)
314 nut member (outside diameter member of the present invention)
316 swing arm (thrust transmission member of the present invention)

The invention claimed is:

1. A two-speed transmission apparatus for an electric vehicle which uses an electric motor for driving wheels, comprising:
a housing;
an input axis which is supported by said housing and is connected to an electric rotational driving motor side;
an output axis which is supported by said housing and is connected to said wheels sides;
a first gear mechanism comprising gears to mesh in order to get a transmission ratio of a first speed between said output axis and said input axis when said input axis is connected;
a second gear mechanism comprising gears to mesh in order to get a transmission ratio of a second speed, which is higher gear ratio than said first speed of a same rotational direction, between said output axis and said input axis when said input axis is connected;
a first multi-plate friction clutch to get said transmission ratio of said first speed by transmitting a rotation of said input axis to said first gear mechanism at a fastening time;
a second multi-plate friction clutch which is coaxially and separately in a axial direction arranged on said first multi-plate friction clutch, and to get said transmission ratio of said second speed by transmitting said rotation of said input axis to said second gear mechanism at said fastening time; and
an actuator to selectively fasten said first multi-plate friction clutch and said second multi-plate friction clutch,
wherein said actuator comprises:
a control motor being a torque source;
gears to mesh for a torque transmission;
an inside diameter member and an outside diameter member to screw to convert a torque into a thrust;
a thrust transmission member for transmitting said thrust; and
a clutch pressure member to press said first multi-plate friction clutch and/or said second multi-plate friction clutch in order to fasten by said thrust, and
wherein said inside diameter member is arranged so as to receive a torque from torque transmission gears, and said outside diameter member is slidably supported by said housing in order to convert said thrust applied to said inside diameter member into said thrust.

2. The two-speed transmission apparatus for an electric vehicle according to claim 1,
wherein a pair of actuators are shared to fasten said first multi-plate friction clutch and said second multi-plate friction clutch, and said clutch pressure member selectively fastens said first multi-plate friction clutch and said second multi-plate friction clutch by moving back and forth in an axial direction with said outside diameter member via said thrust transmission member.

3. The two-speed transmission apparatus for an electric vehicle according to claim 2,
wherein said outside diameter member and said thrust transmission member are constituted as a double cylindrical body comprising an inside cylindrical part and an outside cylindrical part which are a same core with a transmission-apparatus center axis line and a radial direction wall part is integrally connected with said inside cylindrical part and said outside cylindrical part,
wherein said inside cylindrical part is screwed with said inside diameter member at outside of said first multi-plate friction clutch and said second multi-plate friction clutch on a central axis line,
wherein said outside cylindrical part is slidably fitted into an inner circumferential surface of said housing while facing to said first multi-plate friction clutch or said second multi-plate friction clutch which is located at proximal side, and
wherein said clutch pressure member is fixed at said outside cylindrical part so as to locate between said first multi-plate friction clutch and said second multi-plate friction clutch.

4. The two-speed transmission apparatus for an electric vehicle according to claim 3,
wherein said clutch pressure member comprises a ring plate member which is press-molded and is extended to a radial direction between said first multi-plate friction clutch and said second multi-plate friction clutch,
wherein said clutch pressure member is integrally connected to said outside cylindrical part at an outer circumferential end,
wherein said clutch pressure member includes a first press molding part to press either one of said first multi-plate friction clutch and said second multi-plate friction clutch at an inner circumferential end, and
wherein said clutch pressure member includes a second press molding part to press another one of said first multi-plate friction clutch and said second multi-plate friction clutch at an intermediate portion.

5. The two-speed transmission apparatus for an electric vehicle according to claim 4,
wherein said fastening of said first multi-plate friction clutch and said second multi-plate friction clutch is carried out by that an inner circumferential portion joins to an outer circumferential portion with pretty elastic deformation in an axial direction.

6. The two-speed transmission apparatus for an electric vehicle according to claim 2,
wherein said two-speed transmission apparatus includes a planetary gear-type transmission mechanism being connected to said input axis and said output axis,
wherein said input axis is coaxially disposed in said housing with said output axis,
wherein said planetary gear-type transmission mechanism includes a carrier that a pinion is axially supported and three rotational elements associated with two gears having different tooth number meshing with said pinion, and said input axis and said output axis are connected to two elements of said three-rotational element,
wherein an arrangement of said first multi-plate friction clutch and said second multi-plate friction clutch against said three rotational elements and said housing constitutes said planetary gear-type transmission mechanism as a first gear mechanism so as to get a first speed transmission ratio between said input axis and said output axis by a fastening of said first multi-plate friction clutch and a no-fastening of said second multi-plate friction clutch due to said thrust transmission mechanism, and
wherein an arrangement of said first multi-plate friction clutch and said second multi-plate friction clutch against said three rotational elements and said housing constitutes said planetary gear-type transmission mechanism as a second gear mechanism so as to get a second speed transmission ratio between said input axis and said output axis by a no-fastening (release) of said first multi-plate friction clutch and a fastening of said second multi-plate friction clutch due to said thrust transmission mechanism.

7. The two-speed transmission apparatus for an electric vehicle according to claim 6,
wherein said first multi-plate friction clutch contributes to form said first speed transmission ratio by reducing a speed between said input axis and said output axis by connecting one of two rotational elements which is not said carrier of said planetary gear-type transmission mechanism,
wherein said second multi-plate friction clutch contributes to form said second speed transmission ratio by integrally rotating said rotating element between said input axis and said output axis, and
further comprising a one-way clutch which is arranged for a driving torque transmission in parallel to said first multi-plate friction clutch between said output axis and said housing.

8. The two-speed transmission apparatus for an electric vehicle according to claim 7,
wherein said one-way clutch is constrained and said electromagnetic brake is restrained at a driving time at said first speed transmission ratio, and said one-way clutch is free and said electromagnetic brake is fastened at a coast time at said first speed transmission ratio.

9. The two-speed transmission apparatus for an electric vehicle according to claim 2,
wherein said first gear mechanism comprises first spur gears to get said first speed transmission, and said second gear mechanism comprises second spur gears to get said second speed transmission.

10. The two-speed transmission for an electric vehicle according to claim 9,
further comprising a one-way clutch which is arranged for a driving torque transmission in parallel to said first multi-plate friction clutch between said input axis and said output axis.

11. The two-speed transmission apparatus for an electric vehicle according to claim 1,
wherein a pair of actuators are shared to fasten said first multi-plate friction clutch and said second multi-plate friction clutch,
wherein said thrust transmission member rotates forward and backward by an axial back and forth movement of said inner diameter member, and wherein said clutch pressure member selectively fastens said first multi-plate friction clutch and said second multi-plate friction clutch by said forward and backward rotation of said thrust transmission member.

12. The two-speed transmission apparatus for an electric vehicle according to claim 11,
wherein said thrust transmission member is pivotally mounted on said housing at one end,
wherein said thrust transmission member is constituted as a swing arm which is loosely fitted into an inner screw member at a diameter conflict position at another end across said first multi-plate friction clutch and said second multi-plate friction clutch,
wherein said clutch pressure member pivotally mounted on said swing arm at said diameter conflict position and is located between counter-face surfaces of said first multi-plate friction clutch and said second multi-plate friction clutch, and
wherein said forward and backward rotation of said swing arm due to said axial back and forth movement of said inner screw member fastens said first multi-plate friction clutch and said second multi-plate friction clutch while said clutch pressure member meets said first multi-plate friction clutch or said second multi-plate friction clutch.

13. The two-speed transmission apparatus for an electric vehicle according to claim 1,
wherein two are sets as said actuator, a first set actuator contributes to fasten and release said first multi-plate friction clutch for setting said first speed transmission ratio, and a second set actuator contributes to fasten and release said second multi-plate friction clutch for setting said second speed transmission ratio.

14. The two-speed transmission apparatus for an electric vehicle according to claim 13,
wherein ends of said thrust transmission members are pivotally mounted on said housing in respective said actuators,
wherein said thrust transmission member is constituted as a swing arm which is loosely fitted into an inner screw member at a diameter conflict position at another end across said first multi-plate friction clutch for said first set actuator and said second multi-plate friction clutch for said second set actuator,
wherein said clutch pressure member pivotally mounted on said swing arm at said diameter conflict position, and
wherein said forward and backward rotation of said swing arm due to said axial back and forth movement of said inner screw member fastens said first multi-plate friction clutch for said first set actuator and fastens said second multi-plate friction clutch for said second set actuator.

15. The two-speed transmission apparatus for an electric vehicle according to claim 1,
wherein gears to mesh for torque transmission comprise a pair of spur gears.

16. The two-speed transmission apparatus for an electric vehicle according to claim 1,
wherein gears to mesh for torque transmission comprise a worm of said control motor side and a wheel to mesh with said worm.

17. The two-speed transmission apparatus for an electric vehicle according to claim 1,
wherein said inner screw member and said outer screw member closely contain many balls to infinitely circulate between said inner screw member and said outer screw member.

18. The two-speed transmission apparatus for an electric vehicle according to claim 1,
further comprising an electromagnetic brake to fasten and keep said first multi-plate friction clutch and/or said second multi-plate friction clutch by braking a rotational axis of said control motor.

19. The two-speed transmission for an electric vehicle according to claim 18,
wherein said first multi-plate friction clutch and/or said second multi-plate friction clutch again grasp by performing said braking of said rotational axis of said control motor at a predetermined cycle.

20. The two-speed transmission apparatus for an electric vehicle according to claim 18,
wherein said electromagnetic brake performs said braking of said rotational axis of said control motor at a no-energized time.

* * * * *